US012147998B1

(12) United States Patent
Taylor et al.

(10) Patent No.: US 12,147,998 B1
(45) Date of Patent: Nov. 19, 2024

(54) CONSUMER RELATIONSHIP OPTIMIZER

(71) Applicant: Wells Fargo Bank, N.A., San Francisco, CA (US)

(72) Inventors: Benjamin Taylor, Williston, VT (US); Carrie Anne Hanson, Charlotte, NC (US); Dennis Emmanuel Montenegro, Concord, CA (US); Jason Biala, Martinez, CA (US); Jason Huang, San Francisco, CA (US); Sadie Salim, Albany, CA (US); Jasim Ahamed Pattani Sirajudeen, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/662,618

(22) Filed: May 9, 2022

(51) Int. Cl.
*G06Q 30/0207* (2023.01)

(52) U.S. Cl.
CPC .............................. *G06Q 30/0222* (2013.01)

(58) Field of Classification Search
CPC ................................................ G06Q 30/0222
See application file for complete search history.

(56) References Cited

U.S. PATENT DOCUMENTS

| | | | |
|---|---|---|---|
| 7,656,394 B2 * | 2/2010 | Westerman | G06F 3/0447 345/173 |
| 8,156,183 B2 | 4/2012 | Polis et al. | |
| 10,075,451 B1 * | 9/2018 | Hall | H04W 12/084 |
| 10,489,765 B2 | 11/2019 | Priebatsch | |
| 10,805,449 B1 * | 10/2020 | Gordon | G06F 3/04817 |

(Continued)

FOREIGN PATENT DOCUMENTS

| | | | | |
|---|---|---|---|---|
| CN | 112950137 A | | 6/2021 | |
| KR | 20150094580 A | * | 8/2015 | ......... G06Q 30/0222 |

(Continued)

OTHER PUBLICATIONS

Hoehl et al., "From Clouds to Rain: Consolidating and Simplifying Online Communication Services with Easy One Communicator", International Conference on Universal Access in Human-Computer Interaction, vol. 6768, Jul. 9, 2011, pp. 52-61.

*Primary Examiner* — Dipen M Patel
(74) *Attorney, Agent, or Firm* — Shumaker & Sieffert, P.A.

(57) ABSTRACT

This disclosure describes techniques that include a system for supporting payment, data visibility, action recommendations, and advice pertaining to activities across various commercial entities, applications, and/or consumer/commercial entity relationships. In one example, this disclosure describes a method that includes identifying, by a computing system, interactions with each of a plurality of commercial entities; determining, by the computing system, information about incentive policies for each of the plurality of commercial entities; receiving, by the computing system and from a user device, a request; generate, by the computing system, a recommendation, wherein the recommendation is generated based on the request, the interactions with the plurality of commercial entities, and an analysis of the incentive policies for each of the plurality of commercial entities; output, by the computing system, information about the recommendation to be presented by the user device.

20 Claims, 17 Drawing Sheets

(56) References Cited

U.S. PATENT DOCUMENTS

| | | | |
|---|---|---|---|
| 11,030,683 B2 | 6/2021 | Jouhikainen et al. | |
| 2003/0095141 A1* | 5/2003 | Shah | G06F 9/44505 |
| | | | 715/735 |
| 2014/0344015 A1* | 11/2014 | Puertolas-Montanes | |
| | | | G06Q 30/0201 |
| | | | 705/7.29 |
| 2015/0106202 A1 | 4/2015 | Bastaldo-tsampalis et al. | |
| 2016/0301764 A1* | 10/2016 | Ruback | H04W 12/02 |
| 2019/0349477 A1* | 11/2019 | Kotak | H04M 3/4878 |
| 2020/0160458 A1* | 5/2020 | Bodin | H04L 67/53 |
| 2021/0049638 A1* | 2/2021 | Behravesh | G06Q 20/405 |
| 2022/0058681 A1* | 2/2022 | Garner | G06Q 30/0232 |

FOREIGN PATENT DOCUMENTS

| | | |
|---|---|---|
| KR | 20210150791 A | 12/2021 |
| TW | 202014949 A | 4/2020 |

\* cited by examiner

CONSUMER RELATIONSHIP OPTIMIZER

TECHNICAL FIELD

This disclosure relates to network-connected computing systems, and more specifically, to collecting data and communicating the results of an analysis of the data over a network to a device operated by a user.

BACKGROUND

Users of computing devices commonly maintain relationships with various commercial entities, and in many cases, such relationships are supported through applications installed on and executed on a computing device, which is often a mobile device or mobile phone. As a result, mobile devices tend to have many applications installed, each associated with a different commercial entity. Such applications or "apps" may be used to support many types of consumer relationships, such as relationships a consumer or user has with online and/or physical retailers, financial services providers or banks, providers of subscription services, restaurants, providers of medical services, travel services providers, and others. These relationships may each be supported in part through a specific application installed and/or executing on a mobile device, but they may also be supported in other ways, including through online accounts, portals, and/or shopping sites accessed using a web browser, or through physical interactions.

SUMMARY

This disclosure describes techniques that include systems for supporting payment, data visibility, action recommendations, and advice pertaining to activities across various commercial entities, applications, and/or consumer/entity relationships. In some examples, techniques described herein may involve managing multiple relationships for a user across similar services to identify opportunities to unify operations, simplify usage, and/or take advantage of opportunities that might otherwise be difficult to identify. In some examples, a computing system receives information about operations, transactions, interactions, and/or activities of a user of a mobile or other user device. In response, the computing system evaluates such activities in the context of prior activities and preferences of the user, available payment methods, account balance information, purchase incentive structures associated with various commercial entities, and other considerations. Based on such an evaluation, the computing system may generate a proposed, preferred, or potential course of action. In some cases, the computing system may cause a user device to provide advice, notifications, and/or recommendations based on the evaluation or analysis performed by the computing system.

In some examples, the computing system may analyze incentives and reward policies across multiple commercial entities and recommend strategies for maximizing rewards based on available offers and commercial entity/retailer policies. Recommendations, notifications, alerts, and/or other information provided through techniques described herein may benefit the user by, for example, enabling cost savings, enabling time savings, enhancing rewards and/or loyalty benefits, enabling realization of various conveniences, and providing other benefits.

In some examples, this disclosure describes operations performed by a computing system in accordance with one or more aspects of this disclosure. In one specific example, this disclosure describes a method comprising: collecting, by a computing system, information about interactions by a user with each of a plurality of commercial entities; determining, by the computing system, information about incentive policies for each of the plurality of commercial entities; receiving over a network, by the computing system and from a user device operated by the user, a request; generating, by the computing system, a recommendation responsive to the request, wherein the recommendation is generated based on the interactions by the user and an analysis of the incentive policies for each of the plurality of commercial entities; and outputting over the network, by the computing system and to the user device, information to enable presentation of the recommendation at the user device.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

DETAILED DESCRIPTION

Figure 1:
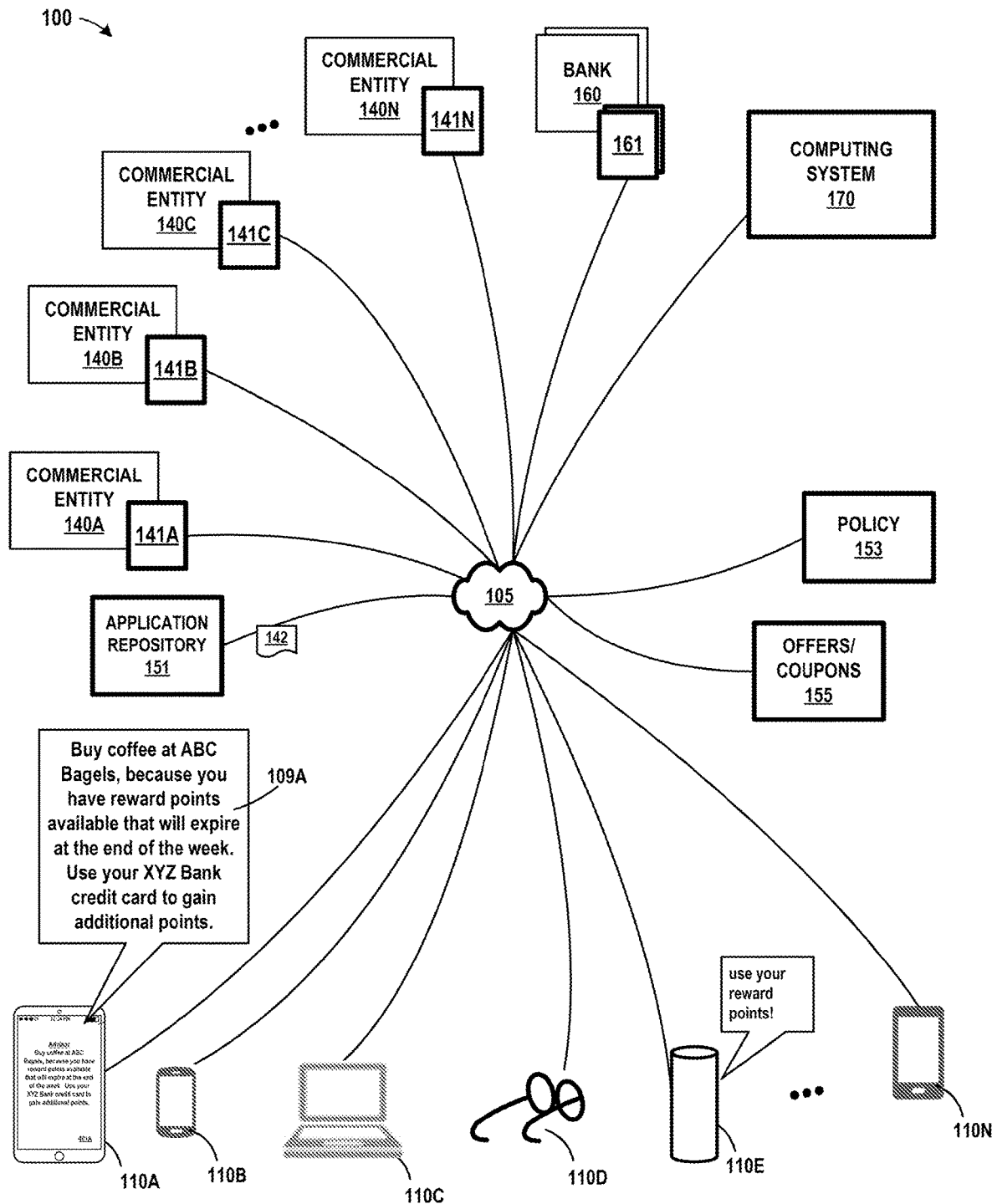
FIG. 1 is a conceptual diagram illustrating an example system for supporting payment, data visibility, and action recommendations across various commercial entities, applications, and/or consumer/entity relationships, in accordance with one or more aspects of the present disclosure.

Users of various computing devices, particularly users of mobile devices, commonly have many subscriptions to various services and/or applications ("apps") associated with an array of vendors, retailers, service providers, or other commercial entities. For example, a typical user might have installed (e.g., on a smartphone) multiple streaming applications (e.g., enabling streaming of movies, data, or other content), multiple restaurant applications (e.g., coffee shops, bagel shops, carry-out restaurants), multiple travel applications (airlines, rental cars, hotels), and others. Even outside of the mobile device context, users may have a corresponding set of user accounts generally accessible through any network-connected device using a web browser, where such accounts enable access to streaming, travel, medical, food service, and other services. Payments and authentication for these accounts and applications are often somewhat disorganized, in the sense that each account and/or application is usually individually configured to use one of a number of possible credit cards or other payment methods, and each account is configured to authenticate using a separate username/password combination. In addition, since each account and/or application tends to independently maintained, without visibility among applications or across accounts, usage insights across multiple applications/accounts are rarely available or at least difficult to identify.

Techniques are described herein to simplify payment and data visibility across relationships a user has with various types of commercial entities, and provide a more consolidated view of activities and opportunities across applications/vendors. The proposed concept may, in some examples, take the form of an application (i.e., an "advisor application"), executing on a user device, that interacts with various other applications also executing on the user device (streaming, restaurant, travel, or other applications). Such an advisor application may, by interacting with other applications on a device, simplify payment and improve data visibility for a given user across multiple vendor accounts associated with that user and/or across multiple different applications used by that user. For example, through simple user interface features, payment methods could be established across multiple applications, potentially unifying payments for purchases relating to multiple commercial entities. In some examples, a bank configured to have visibility over a range of transactions might be able to monitor spending, and in response, provide analytics and deliver insights about spending habits and potential savings opportunities. Such an analysis of spending interactions and spending patterns may reveal certain insights that might have gone unnoticed. For example, the analysis may reveal information about spending trends and/or the aggregate cost of certain categories of spending. The analysis may also identify insights pertaining to certain behavior patterns, such as identifying that a user's spending at a specific retail outlet tends to be higher after that user purchases coffee.

Techniques described herein also involve analyzing information about specific policies associated with various commercial entities, such as information about loyalty awards, rewards, coupons, and/or other offers. Such an analysis may be used to recommend strategies for maximizing rewards based on available offers and commercial entity/retailer policies, and/or for providing information to a user that enables that user to take advantage of various other benefits, cost savings, and/or conveniences.

FIG. 1 is a conceptual diagram illustrating an example system for supporting payment, data visibility, and action recommendations across various commercial entities, applications, and/or consumer/vendor relationships, in accordance with one or more aspects of the present disclosure. System 100 in FIG. 1 includes representations of various commercial entities 140 (i.e., commercial entities 140A through 140N, representing any number of commercial entities). Each commercial entity 140 may be considered an organization or business that provides products and/or services to customers, users, or patrons, or that otherwise interacts with one or more customers, potential customers, consumers, users, or patrons (hereinafter "user" or "users"). Often, each user operates a device, such as any of user devices 110A through 110N ("user devices 110"). Each such user may use one or more user devices 110 to interact with, communicate with, shop, order, and/or pay for products and services provided by one or more of commercial entities 140.

Each of user devices 110 may be any suitable computing system including a mobile, non-mobile, wearable, and/or non-wearable computing device. Each of user devices 110 may be, for example, a smart phone 110A or 110B, desktop or laptop computing device 110C, artificial reality glasses 110D, voice activated device or chatbot 110E, or tablet 110N. Other possible user devices 110 may include a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, or any other type of wearable, non-wearable, mobile, or non-mobile computing device that may perform operations in accordance with one or more aspects of the present disclosure.

Each of commercial entities 140 may operate or control one or more entity computing systems 141. For instance, entity computing system 141A may be a computing system or a group of computing systems operated by or controlled by commercial entity 140A. Similarly, entity computing system 141B may be a computing system or group of computing systems operated by or controlled by commercial entity 140B, and in general, entity computing system 141N is operated by or controlled by commercial entity 140N.

The types of entities represented by commercial entities 140 may be wide-ranging and diverse. Such entities may include, without limitation, entities that provide subscription services (e.g., data, streaming, mobile device connectivity, software), financial services (banking, credit cards, loan processing and/or servicing), restaurants (coffee shops, sandwich shops, or other restaurants that may offer dine-in, carry out, and/or delivery service), advisory services (legal advisors, realtors, personal trainers), medical services (doctor, dentist, nutritionist), travel services (airlines, car rentals, hotel bookings), and retailers (online and/or physical retailers, and may include department stores, clothing stores, drug stores, consignment shops, and/or warehouse membership outlets).

To interact with one or more of commercial entities 140, any of user devices 110 may communicate over network 105, and interact with one or more entity computing systems 141 operated by a given commercial entity 140. Network 105 may be the internet or may include or represent any public or private communications network or other network. For instance, network 105 may be or may include a cellular, Wi-Fi®, ZigBee, Bluetooth, Near-Field Communication (NFC), satellite, enterprise, service provider, and/or other type of network enabling transfer of transmitting data between computing systems, servers, and computing devices.

Although a user's interactions with one or more of commercial entities 140 is primarily described as involving one or more of user devices 110 communicating over network 105, interactions as described herein may take other forms. For example, such interactions might also involve physical interactions between a user and one or more of commercial entities 140, such as a user visiting a bank branch, a user attending a concert or sporting event, or an in-office visit with a legal, financial, or medical advisor.

As described herein, any of user devices 110 may, through communications with one or more entity computing systems 141, purchase goods or services, communicate with a commercial entity 140, or perform other tasks. In some examples, one or more entity computing systems 141 may serve a user interface (e.g., a web page) in response to requests from user device 110, and a user of user device 110 may interact with the user interface to purchase goods, services, or otherwise interact with a given commercial entity 140. In other examples, however, to interact with one or more of commercial entities 140, user device 110 may be configured to execute one or more applications, each designed to interact with a specific one of commercial entities 140. Through such an application, a user of user device 110 may be able to interact with a specific entity computing system 141 in a more customized way, and may also be able to purchase goods or services from a specific commercial entity 140, communicate with that commercial entity 140, access information about an account for the user that is maintained by the commercial entity 140, or otherwise interact with the commercial entity 140 or one of entity computing systems 141 operated or controlled by that commercial entity 140.

Such applications (e.g., represented in FIG. 1 as applications 142) may, in some examples, be accessed through application repository 151, and installed at user device 110 in response to communications over network 105 between one of user devices 110 and application repository 151. Application repository 151 may be operated by a third party as an "app store," and may mandate certain standards for applications published by the application repository 151. In some examples, application repository 151 may provide some degree of uniformity, security, and consistency across multiple applications.

FIG. 1 also illustrates one or more bank entities 160, each operating and/or controlling one or more bank computing systems 161. In some examples, bank entity 160 may provide financial services to one or more users of user devices 110. Such services may include credit and/or banking services, including enabling various payment methods to be used by a user of one or more of user devices 110 (e.g., as a customer of one or more of commercial entities 140). Such payment methods may include checking, credit card, debit card, cryptocurrency services, or other methods of payment. Although illustrated separately from commercial entities 140, one or more of bank entities 160 may be considered to be a commercial entity 140.

Computing system 170, as described herein, may provide support, information, recommendations, advice, and other information pertaining to relationships between a user of user device 110 and one or more of commercial entities 140. Computing system 170 is illustrated in FIG. 1 as a computing system distinct from one or more bank computing systems 161, but in some examples, computing system 170 may be implemented as part of one or more of bank computing systems 161 or may have access to or coordinate certain operations with one or more bank computing systems 161.

Policy repository 153 may perform functions relating to publishing information about policies of one or more of commercial entities 140, and may be implemented through any suitable network-enabled computing system. Policy repository 153 may publish policy information that may include information about hours of operation, return policies, reward and incentive structures offered by each of commercial entities 140, ratings information, and other information pertaining to the operations of each of commercial entities 140. Policy repository 153 may be capable of providing information about applicable policies and other information about one or more commercial entities 140 in response to a query (e.g., a query identifying a specific commercial entity 140). Although policy repository 153 is illustrated as a separate system in FIG. 1, some or all of the functionality of policy repository 153 may, in some examples, be provided by computing system 170 or other systems.

Offers repository 155 may perform functions relating to publishing information about offers or coupons available or applicable to purchases made at one or more commercial entities 140, and may be implemented through any suitable network-enabled computing system. In some examples, offers repository 155 may maintain a list of past, current, and future offers relating to products and/or services provided by one or more of commercial entities 140. In some examples, offers repository 155 may provide serve as a coupon aggregator capable of providing information about available coupons (or coupon codes) in response to a query identifying a specific commercial entity 140 and product or service provided by that commercial entity 140. Although offers repository 155 is illustrated as a separate system in FIG. 1, some or all of the functionality of offers repository 155 may, in some examples, be provided by computing system 170 or other systems.

Each of the computing systems illustrated in FIG. 1 (e.g., entity computing systems 141, application repository 151, bank computing systems 161, computing system 170, policy repository 153, and/or offers repository 155) may be implemented through any suitable computing system, including one or more server computers, workstations, mainframes, appliances, cloud computing systems, and/or other computing devices that may be capable of performing operations and/or functions described in accordance with one or more aspects of the present disclosure. In some examples, each such computing system illustrated in FIG. 1 may represent a cloud computing system, server farm, and/or server cluster (or portion thereof) that provides services to client devices and other devices or systems. In other examples, such computing systems may represent or be implemented through one or more virtualized compute instances (e.g., virtual machines, containers) of a data center, cloud computing system, server farm, and/or server cluster.

In FIG. 1, and in accordance with one or more aspects of the present disclosure, user device 110A may be configured to share, with computing system 170, information about operations and/or activity performed by user device 110A. For instance, in an example that can be described in the context of FIG. 1, user device 110A detects input that it determines corresponds to a command to enable computing system 170 to monitor certain operations of user device 110A. In some examples, enabling such monitoring may involve a configuration change at user device 110A, or may involve installation of an application at user device 110A. In the latter case, application artifacts sufficient to install such an application (e.g., application 142) may be downloaded or otherwise accessed by user device 110A from application repository 151 over network 105. Based on information downloaded from application repository 151, user device 110A may install an application. After installation of such an application (or otherwise following an appropriate configuration of user device 110A), user device 110A monitors activities performed by user device 110A. In addition, user device 110A shares, through communications over network 105 with computing system 170, information about at least some of the activities performed by user device 110A. In some examples, activities and other information shared with computing system 170 may include interactions by user device 110A with one or more of entity computing systems 141, interactions by user device 110A with bank computing system 161, changes in location of user device 110A, information about locations of user device 110A (e.g., identifying user device 110A as being at a particular retail store, restaurant, bank branch), communications involving user device 110A, input detected by user device 110A, and other information.

User device 110A may share information that enables computing system 170 to generate a recommendation. For instance, continuing with the example being described in the context of FIG. 1, and after configuring device 110A to monitor operations and share them with computing system 170, user device 110A detects movement. User device 110A outputs, over network 105, a signal that includes information about the location of user device 110A and the movement of user device 110A. Computing system 170 detects the signal and determines that the signal includes information about user device 110A. Computing system 170 further determines that the signal includes information suggesting that user device 110A is in the process of approaching a physical retail location of a specific coffee shop (e.g., "Alpha Coffee" corresponding to commercial entity 140A in FIG. 1). Computing system 170 further determines, based on historical information about movements of user device 110A and historical transaction information available to computing system 170, that the user of user device 110A routinely stops for coffee at Alpha Coffee at about this same time of day.

Computing system 170 may generate a recommendation based on the information received from user device 110A. For instance, again continuing with the example being described in the context of FIG. 1, and in response to the determinations described above, computing system 170 analyzes previously-collected information about the user of user device 110A, which may include information about payment methods available to or often used by the user, rewards points available to the user, available gift cards, incentives provided by various payment methods, interest rates on credit available to the user, and other information. Computing system 170 further analyzes policy information associated with Alpha Coffee (i.e., commercial entity 140A), which may specify how rewards points are awarded, redeemed, and expire, as well as how and under what circumstances incentives are provided for purchases or other activities by customers of commercial entity 140A. In some examples, computing system 170 may collect such policy information directly from entity computing system 141A. In other examples, computing system 170 collects some or all of such information from policy repository 153 or elsewhere. Computing system 170 may also identify policy information associated with commercial entities 140 other than commercial entity 140A, which may include information pertaining to other coffee shops. Information pertaining to other coffee shops may be of interest to the user of user device 110A if there are advantages, benefits, or cost-savings to be gained by purchasing coffee at a competing coffee shop (e.g., commercial entity 140B), rather than at Alpha Coffee (i.e., commercial entity 140A). Computing system 170 uses this information and other information to perform an analysis and generate a recommendation.

Computing system 170 may output a recommendation for presentation by user device 110A. For instance, still with reference to the example being described in the context of FIG. 1, computing system 170 outputs a signal over network 105. User device 110A detects a signal over network 105 and determines that the signal includes information about a recommendation to be presented to the user of user device 110A. User device 110A outputs the recommendation using an output device, such as by presenting the recommendation as an audible notification 109A, as illustrated in FIG. 1. Alternatively, or in addition, user device 110A may present the recommendation on a display screen associated with or included within user device 110A. As illustrated in FIG. 1, user device 110A presents a recommendation (e.g., through notification 109A) suggesting that the user instead buy coffee at "ABC Bagels" (e.g., rather than at "Alpha Coffee") for the reasons stated in notification 109A.

In other examples, however, notification 109A might not recommend purchasing coffee at a location different than Alpha Coffee, and instead, could take other forms. For instance, in a different example, notification 109A may simply remind the user to use an unused gift card at Alpha Coffee, or may suggest making a specific purchase that will maximize or enhance certain rewards that may accrue to the user, based on the specific incentive structure policies in place at commercial entity 140A (i.e., "Alpha Coffee"). In other examples, notification 109A might remind the user to cancel a "frequent buyer membership" that the user previously signed up for at Alpha Coffee, particularly where computing system 170 has determined that the membership has not been used recently, has not been used often enough to justify the price of the membership, and/or where a free or reduced-cost trial period for the membership is set to expire in the near future. In another example, notification 109A may include information about a coupon that might be applicable to a purchase (e.g., a "coupon code" retrieved from offers repository 155). Other types of recommendations or guidance could also be presented by user device 110A.

Although the example outlined above is described in terms of a mobile device (user device 110A) presenting a recommendation through an audible notification, or through a notification presented at a display associated with user device 110A, recommendations could be provided in other ways. For instance, when the user is operating a desktop device (e.g., user device 110C) a recommendation or notification might be presented in a window on a display associated with that device. Similarly, when the user is wearing an artificial reality or augmented reality device (e.g., user device 110D) or is driving an automobile equipped with an in-vehicle heads-up display, a recommendation or notification might be provided in a way appropriate for that type of user device. In another example, a chatbot used by the user (e.g., user device 110E) might provide conversational audible sounds that include recommendations and/or notifications. Other forms of user devices 110 could be used, and the manner in which recommendations, advice, and/or notifications are provided may vary depending on the capabilities and design of each specific user device 110.

Further, computing system 170 may provide recommendation and/or notifications to many users concurrently or simultaneously. For example, a user of user device 110A might receive a notification about buying coffee, while a different user, operating a different user device 110, might receive a different recommendation or notification. In other words, while the user of user device 110A is approaching "Alpha Coffee," a user of user device 110C may be researching travel, resulting in computing system 170 generating, for the user of user device 110C, a recommendation about how to book such travel. Computing system 170 may, at an appropriate time, cause such a recommendation or notification to be presented to the user through user device 110C. In general, computing system 170 may perform analyses relevant to each of a number of users, and provide recommendations, notifications, and/or other communications that are specifically tailored to the preferences, situation, account status, rewards status, payment method capabilities, activities, and/or other context associated with each user. Such recommendations, notifications, alerts, or other advice may be generated and/or provided in an attempt to enable each user to save money, save time, maximize rewards benefits, realize conveniences, and obtain other benefits.

The techniques described herein may provide other technical advantages. For instance, in examples where one or more user devices 110 communicate over network 105 with computing system 170, computing system 170 may provide improved visibility, oversight, and management of various operations performed in system 100 of FIG. 1. Such additional visibility may enable insights as to correlations between operations and communications performed within system 100. Such insights may be used to improve communications among devices within system 100, and may also be used to reduce unwanted, inefficient, and superfluous operations otherwise performed by one or more devices within system 100. Such effects may reduce processing complexity, reduce processing cycles consumed, and provide certain efficiencies that, in some cases, eliminate the need for one or more user devices 110 to perform additional operations (e.g., at the direction of a user) to identify an appropriate course of action for a user.

Throughout the disclosure, examples may be described where a computing device (e.g., one or more of user devices 110) and/or a computing system (e.g., computing system 170) receives information and thereafter analyzes information associated with users of user devices 110. To preserve certain privacy interests of users, it may be appropriate for such computing devices (e.g., user devices 110 and/or computing system 170) to analyze such information only after receiving permission from each specific user. For example, in some examples described in this specification, before a computing device can collect or make use of information associated with a user, the user may be provided with an opportunity to control whether the computing device can collect or make use of information about the user (e.g., information about the input detected by a computing device, such as audio, images, or geolocation information detected by the computing device), or to dictate whether and/or how the computing device can use such information. In some examples, certain data may be modified so that personally-identifiable information is removed. In other examples, a user's geographic location may be generalized where location information is obtained (such as to a city, ZIP code, or state level), so that a location of a user cannot be determined.

Figure 2:
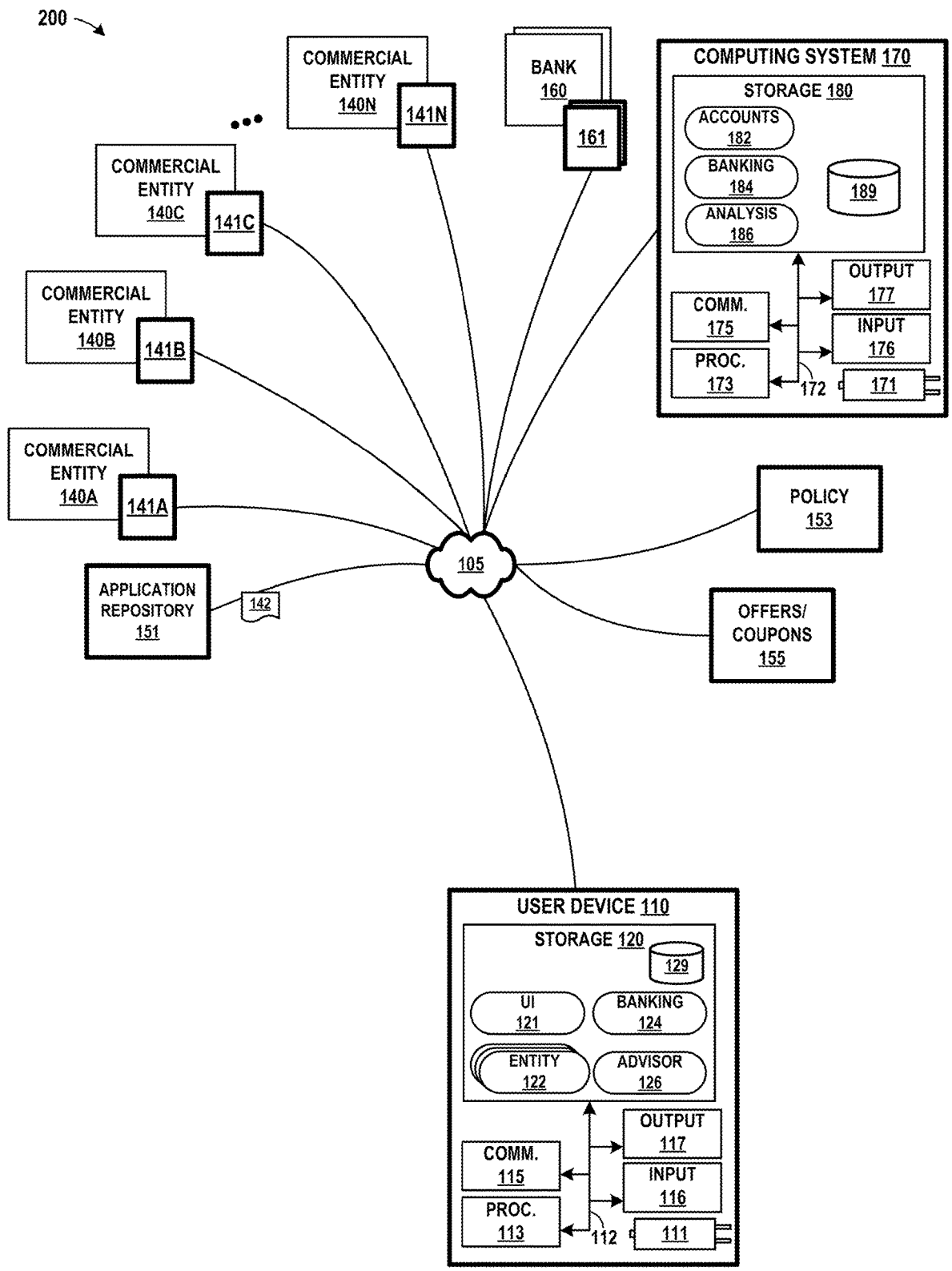
FIG. 2 is a block diagram illustrating an example system for supporting payment, data visibility, and action recommendations across various entities, applications, and/or consumer/entity relationships, in accordance with one or more aspects of the present disclosure.

FIG. 2 is a block diagram illustrating an example system for supporting payment, data visibility, and action recommendations across various entities, applications, and/or consumer/vendor relationships, in accordance with one or more aspects of the present disclosure. In FIG. 2, system 200 includes many of the same elements of system 100 that is described in connection with FIG. 1, and elements illustrated in FIG. 2 may correspond to earlier-illustrated elements that are identified by like-numbered reference numerals. For instance, FIG. 2 illustrates detail views of both computing system 170 and user device 110. Computing system 170 of FIG. 2 may correspond to computing system 170 of FIG. 1, and may be considered an example implementation of computing system 170 of FIG. 1. Similarly, user device 110, as shown in FIG. 2, may correspond to one or more of user devices 110A through 110N of FIG. 1, and may be considered an example or sample implementation of one or more of user devices 110 of FIG. 1.

In general, like-numbered elements of FIG. 1 and FIG. 2 may represent the same or similar elements, and such elements in FIG. 2 may be described in a manner consistent with descriptions provided in connection with FIG. 1. For example, in FIG. 2, network 105 of FIG. 2 may correspond to network 105 of FIG. 1. Entity computing systems 141 of FIG. 2 may correspond to entity computing systems 141 of FIG. 1. Bank computing system 161, policy repository 153, and offers repository 155 of FIG. 2 may correspond to bank computing system 161, policy repository 153, and offers repository 155 of FIG. 1, respectively.

In FIG. 2, computing system 170 is illustrated as including underlying physical hardware that includes power source 171, one or more processors 173, one or more communication units 175, one or more input devices 176, one or more output devices 177, and one or more storage devices 180. Storage devices 180 may include user account module 182, banking module 184, analysis module 186, and data store 189. One or more of the devices, modules, storage areas, or other components of computing system 170 may be interconnected to enable inter-component communications (physically, communicatively, and/or operatively). In some examples, such connectivity may be provided by through communication channels, which may include a system bus (e.g., communication channel 172), a network connection, an inter-process communication data structure, or any other method for communicating data.

Power source 171 of computing system 170 may provide power to one or more components of computing system 170. One or more processors 173 of computing system 170 may implement functionality and/or execute instructions associated with computing system 170 or associated with one or more modules illustrated herein and/or described below. One or more processors 173 may be, may be part of, and/or may include processing circuitry that performs operations in accordance with one or more aspects of the present disclosure. One or more communication units 175 of computing system 170 may communicate with devices external to computing system 170 by transmitting and/or receiving data, and may operate, in some respects, as both an input device and an output device. In some or all cases, communication unit 175 may communicate with other devices or computing systems over network 105 or over other networks.

One or more input devices 176 may represent any input devices of computing system 170 not otherwise separately described herein, and one or more output devices 177 may represent any output devices of computing system 170 not otherwise separately described herein. Input devices 176 and/or output devices 177 may generate, receive, and/or process output from any type of device capable of outputting information to a human or machine. For example, one or more input devices 176 may generate, receive, and/or process input in the form of electrical, physical, audio, image, and/or visual input (e.g., peripheral device, keyboard, microphone, camera). Correspondingly, one or more output devices 177 may generate, receive, and/or process output in the form of electrical and/or physical output (e.g., peripheral device, actuator).

One or more storage devices 180 within computing system 170 may store information for processing during operation of computing system 170. Storage devices 180 may store program instructions and/or data associated with one or more of the modules described in accordance with one or more aspects of this disclosure. One or more processors 173 and one or more storage devices 180 may provide an operating environment or platform for such modules, which may be implemented as software, but may in some examples include any combination of hardware, firmware, and software. One or more processors 173 may execute instructions and one or more storage devices 180 may store instructions and/or data of one or more modules. The combination of processors 173 and storage devices 180 may retrieve, store, and/or execute the instructions and/or data of one or more applications, modules, or software. Processors 173 and/or storage devices 180 may also be operably coupled to one or more other software and/or hardware components, including, but not limited to, one or more of the components of computing system 170 and/or one or more devices or systems illustrated or described as being connected to computing system 170.

User account module 182 may perform functions relating to management of accounts and data associated with users of one or more of user devices 110. User account module 182 may verify the identity of a user operating one or more of user devices 110, and may interact with data store 189 to collect or store relevant information about such a user.

Banking module 184 may perform functions relating to payment processing, identifying appropriate methods of payment, and interacting with one or more financial accounts held by a user of one of user devices 110. In some examples, banking module 184 may interact with bank computing systems 161 (e.g., over network 105) to collect and/or analyze transaction data, post transactions, and/or perform other functions.

Analysis module 186 may perform functions relating to performing analyses using, among other information, incentive structures associated with rewards programs offered by one or more commercial entities 140. Analysis module 186 may also perform analyses relating to users' payment options, preferences, location, time of day, as well as the policies, hours of operation, and other attributes of one or more commercial entities 140. Analysis module 186 may perform functions that enable, through various operations described herein, simplified and/or improved payment, data visibility, and action recommendations across various commercial entities 140.

Data store 189 of computing system 170 may represent any suitable data structure or storage medium for storing information relating to data collected from one or more user devices 110, information otherwise collected about activities user devices 110 or users of such devices, information about policies of one or more of commercial entities 140, and/or information about offers, coupons, or other opportunities associated with commercial entities 140. The information stored in data store 189 may be searchable and/or categorized such that one or more modules within computing system 170 may provide an input requesting information from data store 189, and in response to the input, receive information stored within data store 189. Data store 189 may be primarily maintained by analysis module 186.

In the example of FIG. 2, user device 110 is also illustrated as including underlying physical hardware, and such hardware may include power source 111, one or more processors 113, one or more communication units 115, one or more input devices 116, one or more output devices 117, and one or more storage devices 120. These components may be implemented in the manner described with respect to similar components (e.g., those of computing system 170) described elsewhere herein. For example, power source 111 may provide power to one or more components of user device 110. One or more processors 113 may implement functionality and/or execute instructions associated with user device 110 or associated with one or more modules of user device 110. One or more communication units 115 of user device 110 may communicate with devices external to user device 110 by transmitting and/or receiving data over a network or otherwise. One or more input devices 116 and output devices 117 may generate, receive, and/or process input and output, respectively. One or more storage devices 120 may store program instructions and/or data associated with one or more of the modules of storage devices 120 in accordance with one or more aspects of this disclosure.

For various user devices 110, input devices 116 and output devices 117 may each function as an input and/or output device or set of input/output devices for a given user device 110, and may be implemented using various devices, components, and/or technologies. For example, input devices 116 and output devices 117 may include one or more user interface devices that include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input. Such user interface devices may include display devices, speaker technologies, haptic feedback technologies, tactile feedback technologies, light emitting technologies, or other output device technologies for use in outputting information to a user.

Storage devices 120 of user device 110 may include user interface module 121, entity modules 122, banking module 124, advisor module 126, and data store 129. User interface module 121 may perform functions relating to presenting audio, visual, or other information, such as through audio devices, display screens, haptic feedback devices, or otherwise. User interface module 121 may also act as an interface for receiving input from a user, through touch interactions, voice commands, or otherwise. Entity modules 122 may each serve as an application designed to enable communications, transactions, payment processing, and other interactions with a specific entity computing system 141 or a subset of entity computing systems 141. In some examples, a given entity module 122 may correspond to an application designed, developed, and/or published by a specific commercial entity 140 for the purpose of supporting interactions (e.g., through entity computing system 141 or otherwise) with that commercial entity 140. Each of entity modules 122 may be distributed as an application 142 published by application repository 151.

Banking module 124 may perform functions relating to performing financial services, and may be configured to interact with one or more of entity computing systems 141 to perform payment operations. Banking module 124 may also interact with one or more bank computing systems 161 to effectuate payment or payment processing, or to enable a user of user device 110 to obtain information or otherwise perform banking activities. In some examples, banking module 124 may operate as one of entity modules 122 and/or may interact with one or more of such entity modules 122.

Advisor module 126 may perform functions that support payment, data visibility, and action recommendations for user device 110 across various entities, applications, and/or consumer/vendor relationships. Advisor module 126 may be designed to communicate with computing system 170 to perform such functions. Advisor module 126 may perform functions relating to overseeing interactions with various commercial entities 140 by a user of user device 110, and making recommendations, offering support, and/or providing advice. In some examples, advisor module 126 may establish a "link" to one or more specific previously-installed entity modules 122. Such a link may mean that advisor module 126 monitors certain operations performed by each linked entity module 122, and observes, evaluates, records, and/or analyzes activity relating to such operations. In some examples, advisor module 126 may communicate information about observed activity of linked entity module 122 over a network for analysis by another system (e.g., computing system 170). As described herein, in order to link one or more entity modules 122 with advisor module 126, explicit user input may be required (e.g., see FIG. 3E).

In some examples, advisor module 126 may be configured to automatically detect one or more entity modules 122 installed on user device 110, and automatically establish a link between advisor module 126 and such entity modules 122. One possible effect of linking advisor module 126 and one or more entity modules 122 is to enable activity or contextual analysis that may result in advisor module 126 providing recommendations and advice as to appropriate and/or advantageous courses of action to be taken by a user of user device 110. Such recommendations or advice may enable the user to save money, save time, take advantage of certain conveniences, or gain other benefits.

Advisor module 126 may be a standalone application or module installed at user device 110. In other examples, advisor module 126 may be part of one or more other applications installed at user device 110. For instance, advisor module 126 may be part of banking module 124, which may enable certain efficiencies and advantages, such as enabling access to transaction information that may be maintained by banking module 124. In such an example, advisor module 126 and banking module 124 may be part of the same application or module, and/or may be capable of sharing information to facilitate interactions with computing system 170.

Data store 129 may represent any suitable data structure or storage medium for storing information related to operations performed by user device 110, and may be used to store data collected from one or more of entity modules 122. The information stored in data store 129 may be searchable and/or categorized such that one or more modules within user device 110 may provide an input requesting information from data store 129, and in response to the input, receive information stored within data store 129. Data store 129 may be primarily maintained by advisor module 126.

Modules illustrated in FIG. 2 (e.g., user account module 182, banking module 184, analysis module 186, user interface module 121, entity modules 122, banking module 124, and advisor module 126) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 3A through FIG. 3E are conceptual diagrams illustrating processes for configuring an example user device 110 to enable communications that support or perform various actions described herein, in accordance with one or more aspects of the present disclosure. User device 110 of FIG. 3A through FIG. 3E may correspond to user device 110 of FIG. 2 and/or one or more of user devices 110 of FIG. 1. In general, illustrations in FIG. 3A through FIG. 3E include many of the same elements of system 200 illustrated in FIG. 1 and FIG. 2. Accordingly, elements illustrated in FIG. 3A through FIG. 3E may correspond to earlier-illustrated elements that are identified by like-numbered reference numerals.

Each of FIG. 3A through FIG. 3E illustrate example user interfaces presented by an example user device 110, typically in the form of a visual on-screen user interface presented by a mobile device. The operations described in connection with the illustrations described below are presented in that context. However, there are other techniques that could be employed to configure user device 110 or similar devices in other contexts (see, e.g., FIG. 1), and such other techniques are considered to be within the scope of the present disclosure.

Figure 3A:
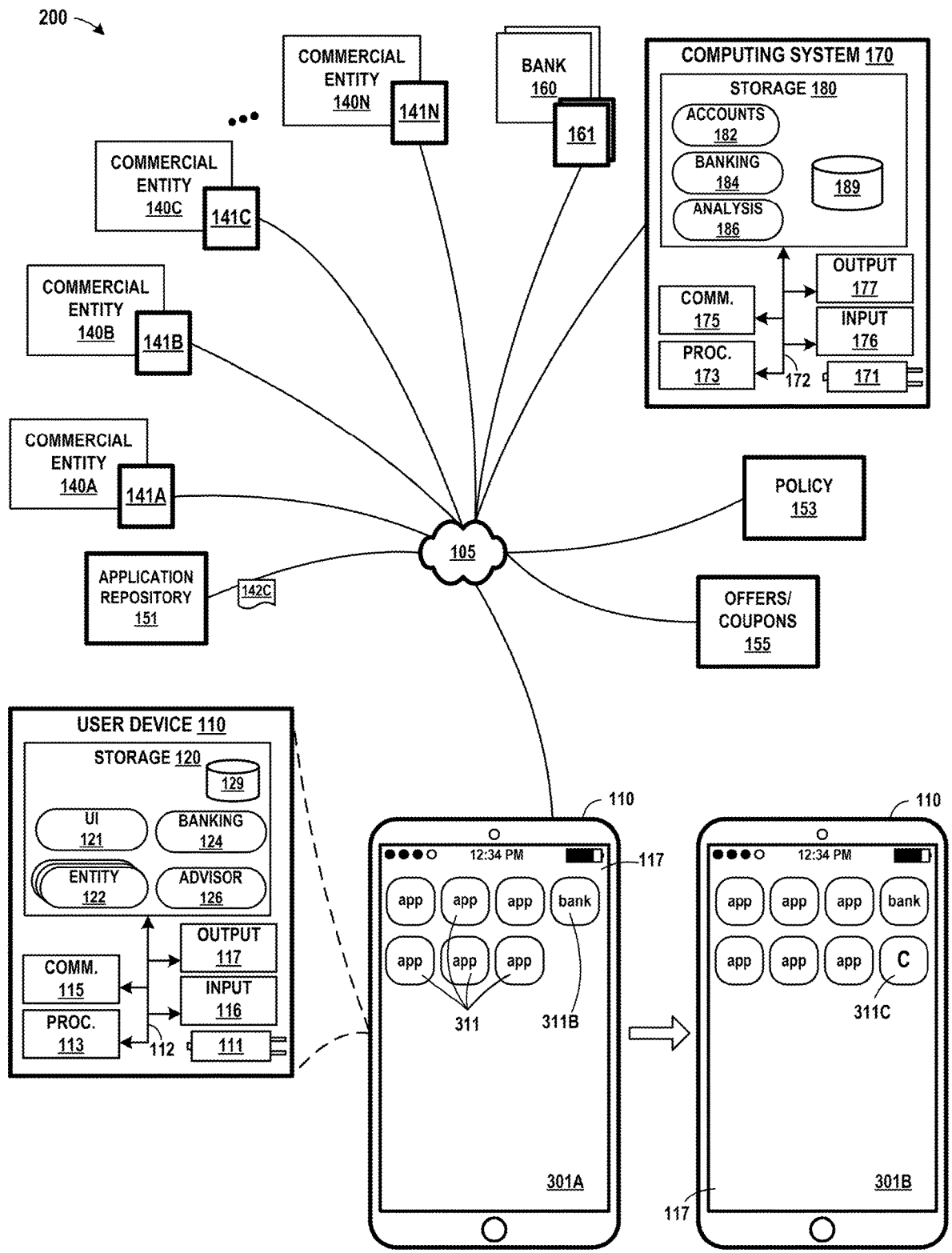
FIG. 3A through FIG. 3E are conceptual diagrams illustrating processes for configuring an example user device to enable communications that support or perform various actions described herein, in accordance with one or more aspects of the present disclosure.

In FIG. 3A, and in accordance with one or more aspects of the present disclosure, user device 110 may download an application associated with one or more commercial entities 140. For instance, in an example that can be described within the context of FIG. 3A, input device 116 of user device 110 detects input and outputs an indication of input to user interface module 121. In some examples, the input may be the result of a user's touch interactions with user interface 301A shown in FIG. 3A. In response to the indication of input, user interface module 121 causes communication unit 115 to output a signal over network 105. Application repository 151 detects a signal over network 105 and determines that the signal corresponds to a request to download and/or install an application associated with or designed by a specific commercial entity 140, such as commercial entity 140C. Application repository 151 outputs a series of signals over network 105. In some examples, the series of signals outputted by application repository 151 may represent or may include application 142C, which may be an application associated with, designed by, and/or configured to support a customer relationship with commercial entity 140C. Specifically, application 142C, once installed, may enable a user of user device 110 to interact, transact, and/or otherwise communicate with commercial entity 140C through entity computing system 141C.

User device 110 may install application 142C and establish a visual representation of application 142C on a display screen of user device 110. For instance, continuing with the example being described in the context of FIG. 3A, communication unit 115 of user device 110 detects signals and outputs information about the signals to user interface module 121. User interface module 121 determines that the signals include application artifacts associated with application 142C. User interface module 121 installs application 142C at user device 110. User interface module 121 of user device 110 causes display element 311C to be presented in a user interface, as shown in user interface 301B of FIG. 3A. As installed at user device 110, application 142C resides within storage device 120 of user device 110 as one of entity modules 122.

Other applications represented by entity modules 122 and display elements 311 may be installed at user device 110 in a similar manner in response to user input and/or in response to other processes. For example, banking module 124, illustrated as stored and/or executing within storage device 120 of user device 110, may also have been installed as a result of downloading an application from application repository 151, typically in response to user input. Banking module 124 may represent an application associated with bank entity 160. Banking module 124 may execute at user device 110 to support that user's relationship with bank entity 160, enabling the user to perform transactions, check balances, perform banking tasks, and/or perform other tasks. As illustrated in FIG. 3A, banking module 124 may be represented by display element 311B within user interface 301A.

As described, applications (e.g., application 142C) may be downloaded to user device 110 from application repository 151 and installed. However, in other examples, one or more applications may be downloaded and/or installed from another device or system. For example, some or all of application 142C may be downloaded from entity computing system 141C or another system controlled by commercial entity 140C. Similarly, some or all of applications associated with each of commercial entities 140 may be downloaded from computing systems operated or controlled by each respective commercial entity 140. And in general, some or all of application artifacts for an application used to support a user/commercial entity relationship with commercial entity 140N may be downloaded from entity computing system 141N. Similarly, some or all of a banking application corresponding to banking module 124 may be downloaded from one or more bank computing systems 161 controlled by bank entity 160.

Figure 3B:
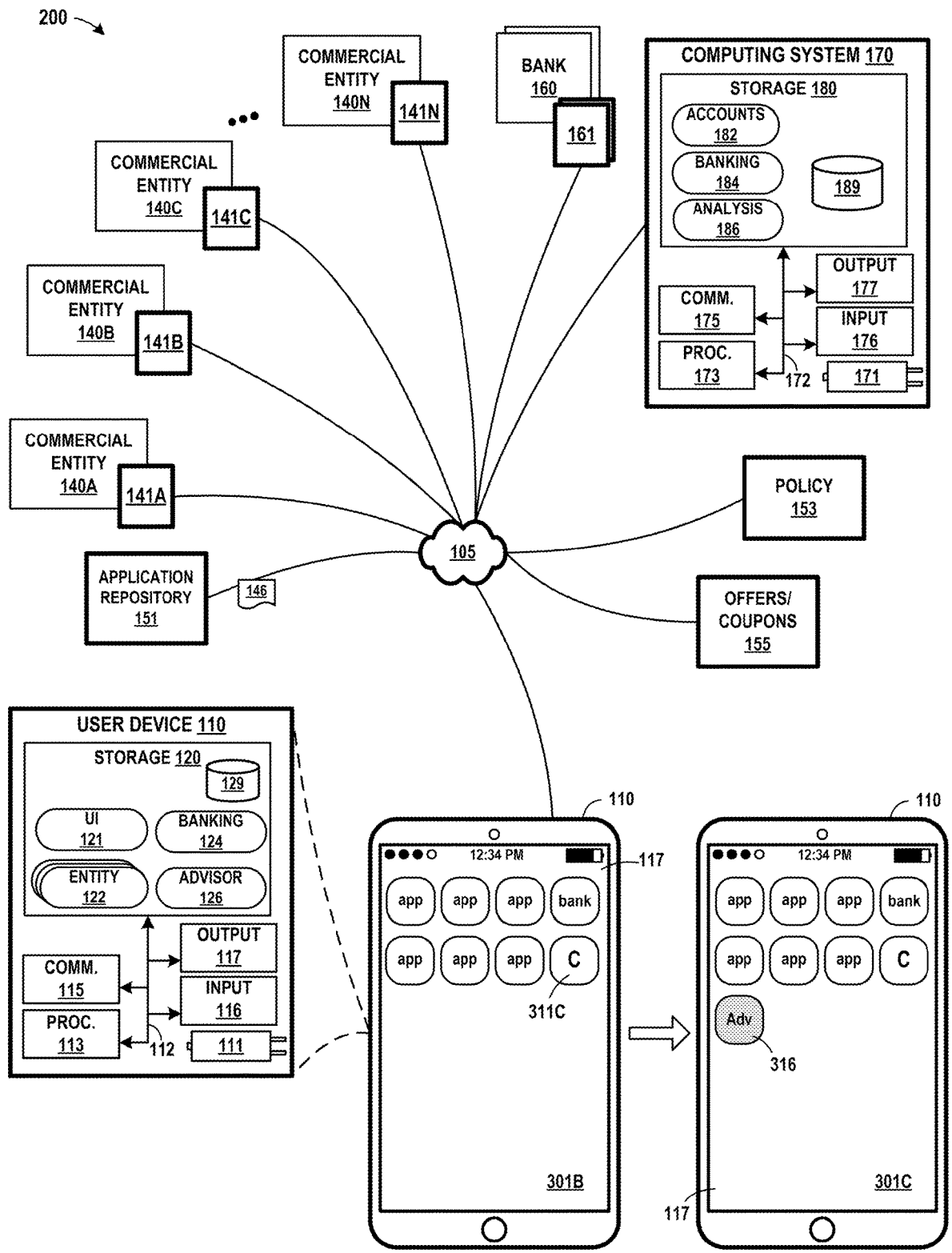

In FIG. 3B, user device 110 may also download and install an application that may oversee and/or observe activities performed by 110, and provide recommendations, advice, and/or perform other functions. For instance, with reference to an example that can be described in the context of FIG. 3B, input device 116 of user device 110 detects input and outputs an indication of input to user interface module 121. User interface module 121 causes communication unit 115 to output a signal over network 105. Application repository 151 detects a signal and determines that the signal corresponds to a request, initiated at user device 110, to download advisor application 146. Application repository 151 outputs a series of signals over network 105. Communication unit 115 of user device 110 receives the signals. In response, user interface module 121 installs advisor application 146 at user device 110. As installed at user device 110, advisor application 146 resides within storage device 120 as advisor module 126. In some examples, advisor module 126 causes advisor module display element 316 to be presented on the display associated with user device 110, as illustrated in FIG. 3B.

Once advisor application 146 is installed at user device 110, advisor module 126 outputs a signal over network 105. Communication unit 175 of computing system 170 detects a signal and outputs information about the signal to user account module 182. User account module 182 determines that the signal includes information about advisor module 126 being installed and now executing at user device 110, operated by a specific user. User account module 182 establishes an account for the user operating user device 110 and stores within data store 189 information about the user and the newly established account. In some examples, such stored information may include information about user preferences, information about one or more devices that the user is operating (e.g., user device 110), and banking or financial information associated with the user (e.g., information about credit cards or other payment methods used by the user).

Figure 3C:
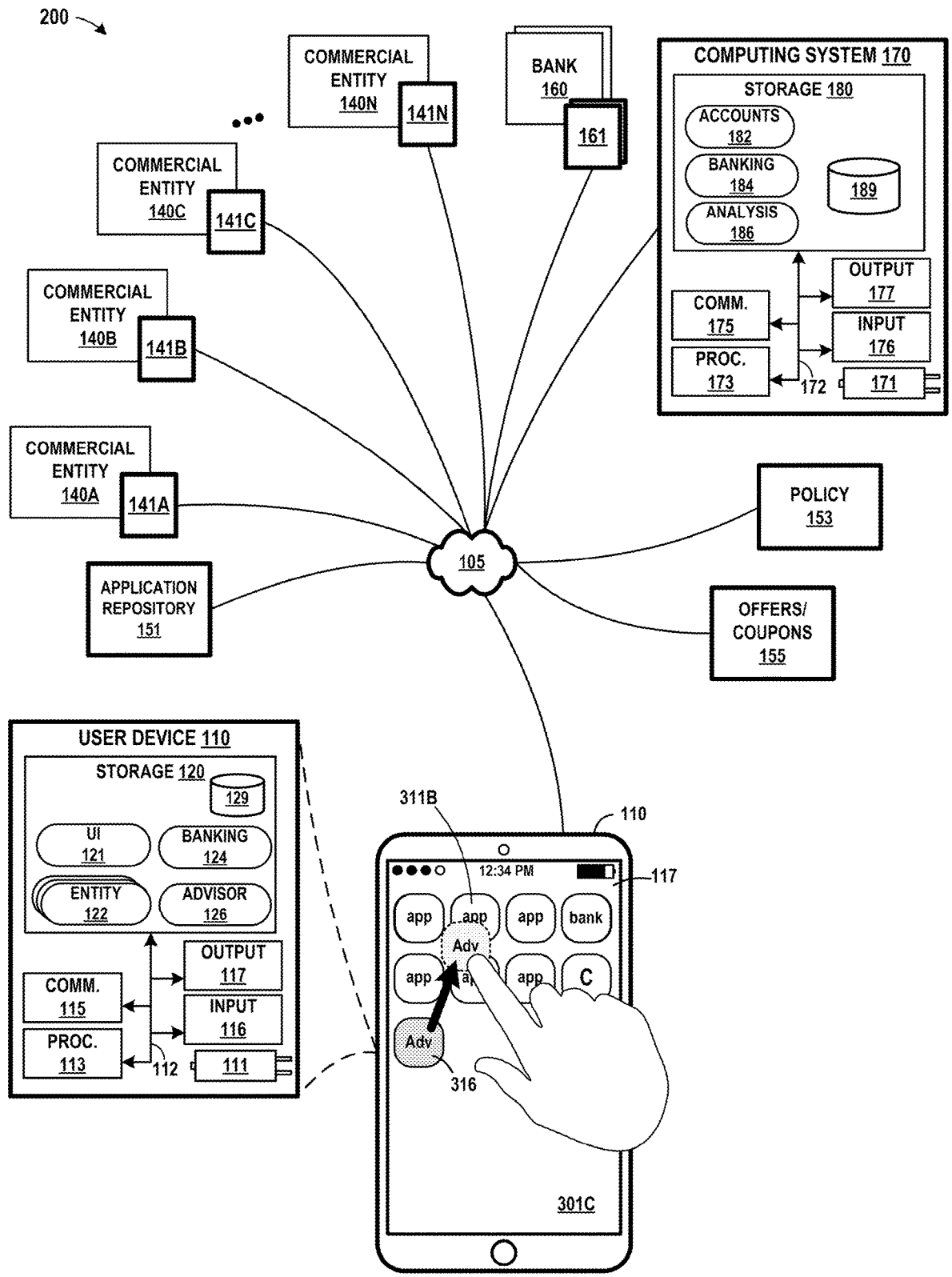

In FIG. 3C, advisor module 126 may be linked to specific entity modules 122 in response to user input. For instance, in an example that can be described in the context of FIG. 3C, input device 116 of user device 110 detects input that user interface module 121 determines corresponds to a user dragging advisor module display element 316 across user interface 301C. User interface module 121 further determines that the dragging motion ends when the user's finger is near display element 311B. User interface module 121 outputs information about the dragging motion to advisor module 126. Advisor module 126 determines that the dragging motion is a command to enable advisor module 126 to interact with the entity module 122 that corresponds to display element 311B and/or to share information about operations performed by that entity module 122. Advisor module 126 identifies which specific entity module 122 corresponds to display element 311B. For example, advisor module 126 may determine that entity module 122B corresponds to display element 311B. Advisor module 126 further determines that entity module 122B represents an application that is used to support the user's relationship with commercial entity 140B.

Advisor module 126 may monitor information and activity associated with the linked entity module 122B. For instance, continuing with the example being described with reference to FIG. 3C, advisor module 126 interacts with entity module 122B and/or analyzes information used by entity module 122B (e.g., stored within data store 129). In some examples, advisor module 126 may use an application programming interface ("API") exposed by entity module 122B that enables other applications (e.g., advisor module 126) to configure entity module 122B to observe operations performed by entity module 122B. In other examples, such as where entity module 122B does not support such an API, advisor module 126 may use an API exposed by the operating system of user device 110 to obtain the same or similar information about operations performed by entity module 122B. In still other examples, advisor module 126 may monitor, observe, and track activity by communication unit 115 to determine operations performed by various entity modules 122, including entity module 122B. In general, once advisor module 126 is linked to entity module 122B, advisor module 126 uses one or more techniques to monitor operations performed by entity module 122B.

Advisor module 126 may cause computing system 170 to store information about the user of user device 110 after commercial entity 140B is identified as an entity that advisor module 126 is monitoring. For instance, referring again to an example that can be described in the context of FIG. 3C, advisor module 126 outputs a signal over network 105. Communication unit 175 of computing system 170 detects a signal and outputs information about the signal to user account module 182. User account module 182 determines that the signal identifies the user of user device 110 and information about the relationship between the user and commercial entity 140B. In some examples, the signal may include information about initial or prior interactions that the user of user device 110 has had with commercial entity 140B (or with entity computing system 141B). Such information may identify transactions, preferences of the user, reward points or incentives available to the user of user device 110, information about offers extended to and/or accepted by the user, or other information. User account module 182 stores information about commercial entity 140B and the user's interactions with commercial entity 140B within the account for the user maintained at computing system 170.

Computing system 170 may collect information about transactions performed by the user of user device 110. For instance, still referring to the example being described in the context of FIG. 3C, computing system 170 outputs a signal over network 105. One or more computing systems associated with one or more financial institutions detect a signal and determine that the signal includes a request for information about transactions performed by the user of user device 110. For example, bank computing system 161, operated or controlled by bank entity 160, may detect the signal and determine that the signal includes a request for information about transactions processed by bank entity 160 between commercial entity 140B and the user of user device 110. Bank computing system 161 determines whether computing system 170 has been authorized to receive such transaction information, such as through a user authorization provided when advisor module 126 was installed at user device 110. In some examples, and as suggested above, banking module 124 and advisor module 126 may be part of the same application, or may otherwise be configured to share information. In such an example, sharing of information between bank computing system 161 and computing system 170 may be enabled from the outset. If bank computing system 161 determines that computing system 170 is authorized to receive such transaction information, bank computing system 161 outputs a signal over network 105. Communication unit 175 of 170 detects a signal over network 105 and outputs information about the signal to banking module 184. Banking module 184 determines that the signal includes transaction information, including information about transactions between the user of user device 110 and commercial entity 140B. Banking module 184 stores some or all of the transaction information within data store 189.

Computing system 170 may also collect information about policies, reward incentives, incentive structures, offers, and/or available services provided by commercial entity 140B. For instance, again referring to the example being described in the context of FIG. 3C, computing system 170 causes 175 to output a signal over network 105. Entity computing system 141B detects a signal and determines that the signal corresponds to a request for information about policies, reward incentives, incentive structures, offers, and/ or available services provided by commercial entity 140B. To the extent such information is published by commercial entity 140B, entity computing system 141B outputs a signal over network 105. Communication unit 175 of computing system 170 detects the signal over network 105 and outputs information about the signal to analysis module 186. Analysis module 186 determines that the signal includes information about policies, reward incentives, incentive structures, offers, and/or available services provided by commercial entity 140B. Analysis module 186 stores at least some of that information within data store 189 for later use and/or analysis.

In some examples, one or more of commercial entities 140 might not publish detailed information about policies, reward incentives, incentive structures, offers, and/or available services in a way that enables analysis by computing system 170. One or more of commercial entities 140 may, for example, choose not to publish such information, or may choose to publish such information in a form that cannot be readily analyzed. In such a situation, computing system 170 may obtain such information through other avenues. For example, computing system 170 may access information that a third party or other service publishes about policies, reward incentives, incentive structures, offers, and/or available services provided by one or more commercial entities 140. In some examples, policy repository 153 may serve as such an information source, and computing system 170 may query policy repository 153, over network 105, to obtain information about in by a third commercial entity 140B third party provided by commercial entity 140B. In another example, an entity operating computing system 170 may undertake its own analysis of various policies, incentive structures, and similar information by one or more commercial entities 140. Information obtained from policy repository 153 or elsewhere may be stored within data store 189 of computing system 170 for later use and/or analysis.

Figure 3D:
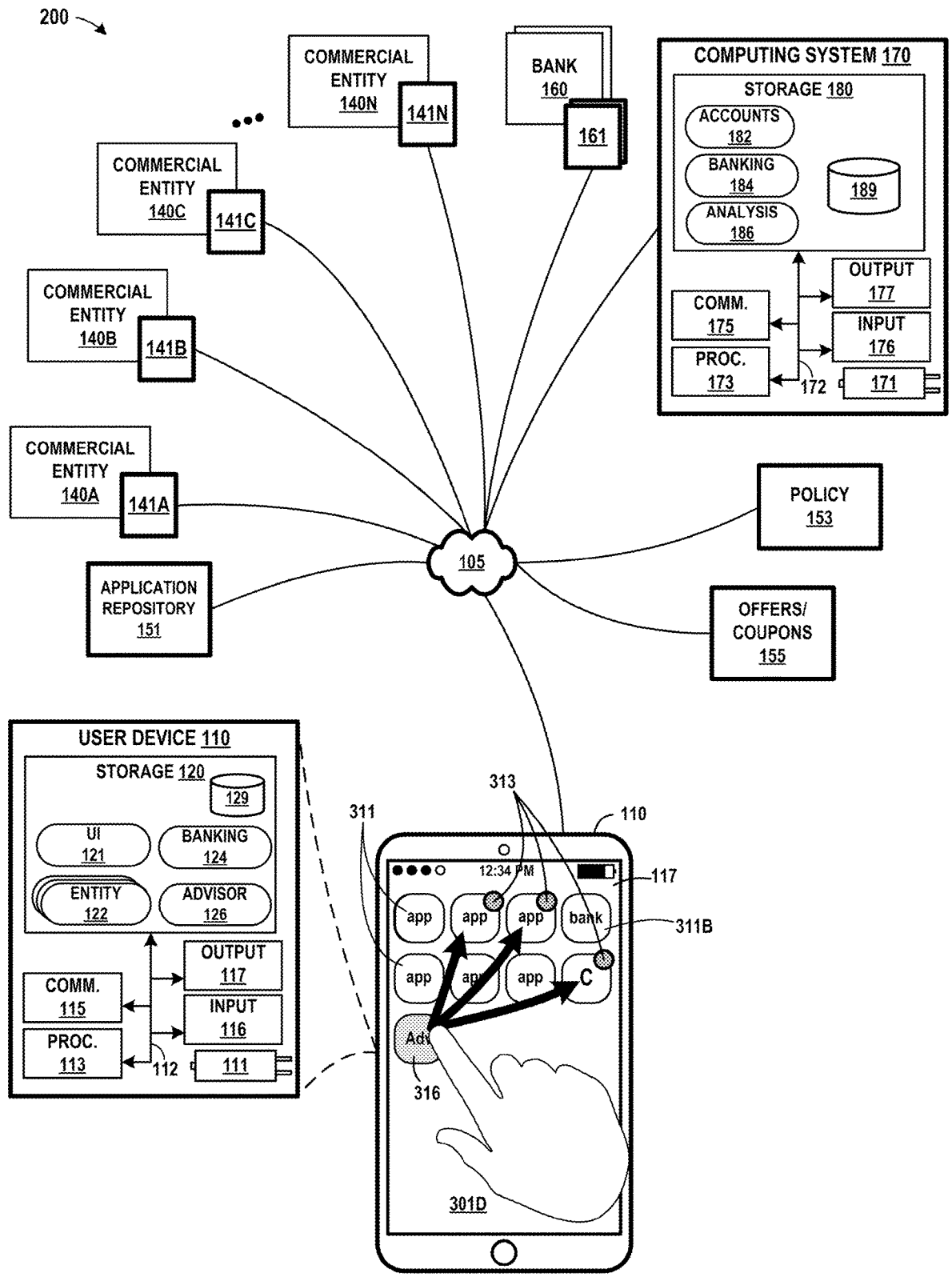

In FIG. 3D, advisor module 126 may also be linked to other entity modules 122 included within storage device 120 of user device 110. For example, in an example that can be described with reference to the illustration of user interface 301D in FIG. 3D, user device 110 may detect further dragging motions, with each dragging motion corresponding to advisor module display element 316 being dragged to other display elements 311. In response to each such dragging motion, advisor module 126 may configure each corresponding entity module 122 to enable communications and/or monitoring operations of such entity modules 122 by advisor module 126. For each such additional application linked to advisor module 126, advisor module 126 may communicate with computing system 170 over network 105, in a manner similar to that described above in connection with FIG. 3C, to configure and enable computing system 170 to perform operations relating to the user of user device 110 and each commercial entity 140 corresponding to a linked entity module 122. Such operations may include computing system 170 storing information about the user of user device 110 and transactions performed by that user with a corresponding commercial entity 140. Such operations may also include computing system 170 collecting information about policies, reward incentives, incentive structures, offers, and/or available services provided by or associated with one or more commercial entities 140.

In some examples, a dragging motion may be used to establish a default payment method for one or more of entity modules 122. For instance, still referring to FIG. 3D, user device 110 may detect input that advisor module 126 determines corresponds to a dragging motion in which display element 311B is dragged across user interface 301D to advisor module display element 316 (not specifically shown in FIG. 3D). Advisor module 126 may determine, based on such input, that an account held by the user at a bank associated with display element 311B (e.g., bank entity 160) should be used as a default payment for one or more of the linked entity modules 122. In response to such a determination, advisor module 126 may configure one or more of entity modules 122 to use, at least by default, a specific account held by the user at bank entity 160 for payments made for goods and services purchased through commercial entities 140 corresponding to entity modules 122 linked to advisor module 126.

In some examples, advisor module 126 may update user interface 301D to provide a visual indication of which of entity modules 122 are linked to advisor module display element 316. For instance, as shown in FIG. 3D, for each monitored entity module 122, the corresponding display element 311 for that entity module 122 may include marker 313 within user interface 301D. Such a marker may signify display elements 311 that are associated with an entity module 122 that is being monitored by or that is linked to advisor module 126.

Examples described in connection with FIG. 3C and FIG. 3D describe example methods in which a user may provide input explicitly linking one or more entity modules 122 with advisor module 126. In other examples, however, such linking of entity modules 122 with advisor module 126 may be performed without requiring user input to link each of a number of entity modules 122 with advisor module 126. In such an example, authorization may be provided just once, indicating that advisor module 126 may automatically detect and link each of (or a defined subset of) the entity modules 122 on user device 110, without requiring further input.

Advisor module 126 and banking module 124 may interact, share information, or otherwise interoperate. For instance, as described herein, some of the functions performed by advisor module 126 may be performed in conjunction with, or with the support of, banking module 124. Accordingly, in some examples, advisor module 126 and banking module 124 may be explicitly designed to work together, thereby enabling efficient sharing of information and facilitating interactions. In other examples, advisor module 126 and banking module 124 may be designed as one application or module, and may appear to the user as the same application. In still other examples, advisor module 126 and banking module 124 may be designed as one application or module, yet still appear to be, from the perspective of the user of user device 110, different applications. In examples where advisor module 126 and banking module 124 interoperate, and where banking module 124 is used to support a user's relationship with bank entity 160, advisor module 126 may automatically use an account held by the user at bank entity 160 as a default payment method, or in some cases, as an exclusive payment method.

Figure 3E:
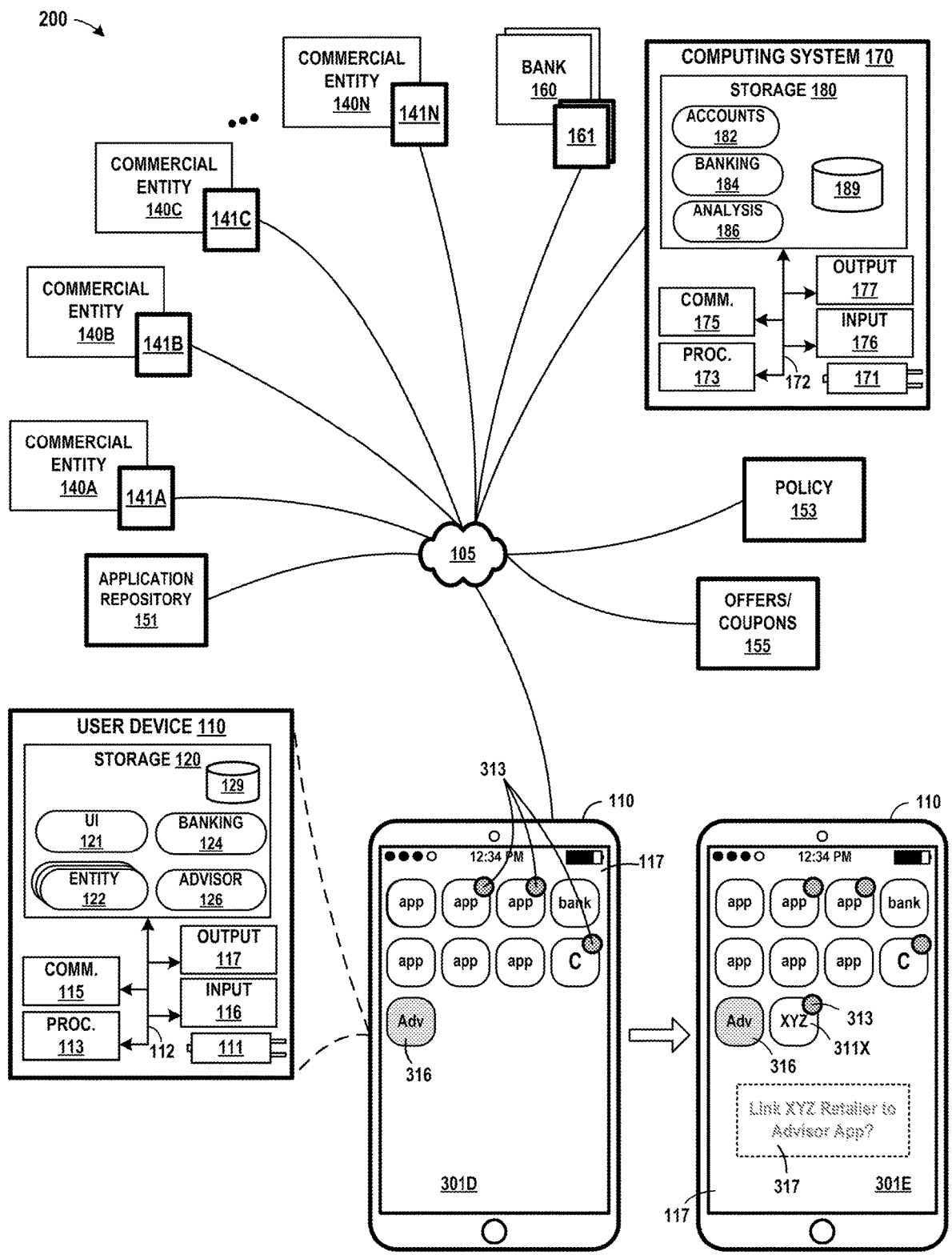

In FIG. 3E, advisor module 126 may also be linked to and monitor new applications that are later installed at user device 110. For example, in an example that can be described with reference to FIG. 3E, user device 110 detects input and in response, outputs a signal over network 105. Application repository 151 detects a signal and determines that the signal includes a request to download an application used to support customers of one of commercial entities 140, such as an entity named "XYZ Retailer." Application repository 151 outputs a series of signals over network 105. User device 110 detects the series of signals, and in response, installs an additional entity module 122 to support activities by the user of user device 110 relating to XYZ Retailer (e.g., shopping activities, customer service queries, loyalty reward tracking, etc.). User device 110 presents display element 311X on user interface 301E, providing a way for a user of user device 110 to interact with and use the entity module 122 corresponding to XYZ Retailer.

In some examples, advisor module 126 detects the installation of entity module 122 for XYZ Retailer and automatically begins monitoring operations performed by the entity module 122 associated with XYZ Retailer. In other examples, however, advisor module 126 may prompt the user for permission to enable advisor module 126 to monitor operations performed by the entity module 122 associated with XYZ Retailer. In such an example, and as illustrated in FIG. 3E, user device 110 may present prompt 317 within user interface 301E. If user device 110 does not receive authorization, advisor module 126 may refrain from establishing a link with the entity module 122 associated with XYZ Retailer and may refrain from monitoring at least some operations relating to XYZ Retailer.

However, if user device 110 detects, in response to prompt 317, input corresponding to authorization to establish a link, advisor module 126 establishes a link to the entity module 122 associated with XYZ Retailer. Such a link may result in advisor module 126 communicating with computing system 170 to store information about the relationship between the user of user device 110 and XYZ Retailer. Such communications may cause computing system 170 to collect and store information about policies, incentive structures, and other information about XYZ Retailer. Advisor module 126 may thereafter begin monitoring operations performed by the entity module 122 associated with XYZ Retailer executing on user device 110. In some examples, advisor module 126 may also cause user interface module 121 to present marker 313 on display element 311X within user interface 301E to reflect that relationship.

In some examples, such as when advisor module 126 and banking module 124 are designed to operate together or share information (or alternatively, where computing system 170 and bank computing systems 161 are designed to share information), various monitoring and activity oversight activities may take place at user device 110 (or at computing system 170), even without advisor module 126 and/or entity modules 122 being installed. For example, in examples where analysis module 186 has access to banking records of each user (e.g., through user account module 182 and/or through access to bank computing systems 161), analysis module 186 may be able to identify at least some transactions, interactions, and other attributes of a relationship between any given commercial entity 140 and a user of user device 110. In some respects, therefore, certain operations described by advisor module 126 and/or various entity modules 122, particularly relating to data collection, might not be necessary where such operations can be performed or reproduced through other means. In such an example, one or more modules executing on user devices 110 to specifically monitor certain transactions and interact with various entity modules 122 might not be required.

FIG. 4A through FIG. 4G represent a series of conceptual diagrams that illustrate techniques relating to payment, data visibility, action recommendations, and/or advisory notifications, in accordance with one or more aspects of the present disclosure. As in FIG. 3A through FIG. 3E, user device 110 of FIG. 4A through FIG. 4G may correspond to user device 110 of FIG. 2 and/or one or more of user devices 110 of FIG. 1. In general, illustrations in FIG. 4A through FIG. 4G include many of the same elements of systems illustrated in FIG. 1 and FIG. 2, and elements illustrated in FIG. 4A through FIG. 4G may correspond to earlier-illustrated elements that are identified by like-numbered reference numerals. Further, although FIG. 4A through FIG. 4G are illustrated in the context of user device 110 as represented by a mobile device or phone, other techniques involving other types of devices may be employed without departing from the spirit and scope of this disclosure.

Figure 4A:
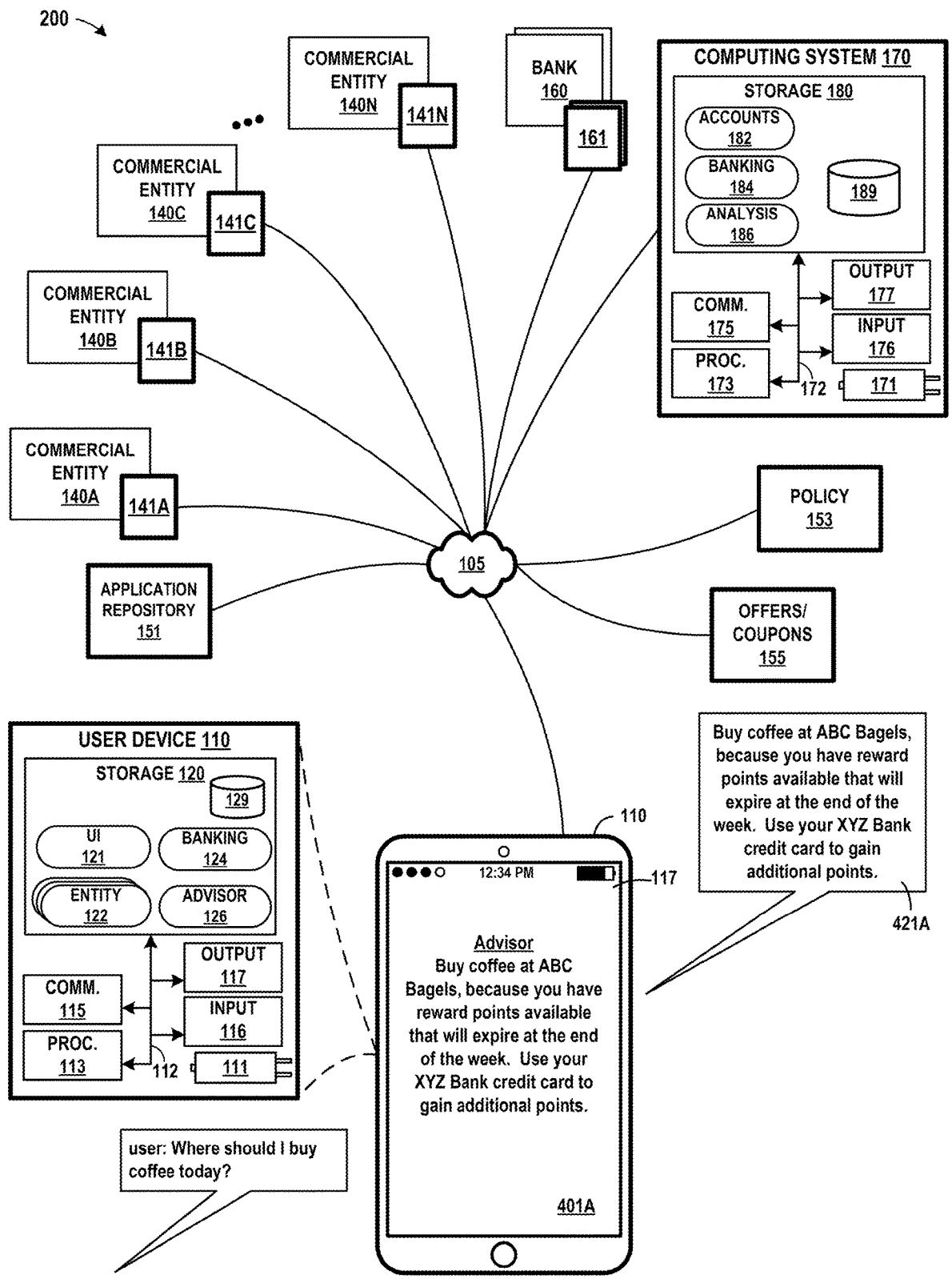
FIG. 4A through FIG. 4G represent a series of conceptual diagrams that illustrate techniques relating to payment, data visibility, action recommendations, and/or advisory notifications, in accordance with one or more aspects of the present disclosure.

In FIG. 4A, and in accordance with one or more aspects of the present disclosure, a user operating user device 110 may seek advice by simply asking a question. For instance, in an example that can be described in the context of FIG. 4A, input device 116 of user device 110 detects audio input and outputs an indication of the audio input to user interface module 121. User interface module 121 outputs information about the input to advisor module 126. Advisor module 126 determines that the input corresponds to audio of a user asking a question (i.e., "where should I buy coffee today?"). Advisor module 126 causes communication unit 115 to output a signal over network 105. Communication unit 175 of computing system 170 detects a signal over network 105 and outputs information about the signal to analysis module 186. Analysis module 186 determines that the signal corresponds to a request to identify an appropriate place for the user of user device 110 to purchase coffee. Analysis module 186 further determines that the signal identifies the location and other information about user device 110.

Computing system 170 may collect information for use in responding to the user's request. For instance, continuing with the example being described in connection with FIG. 4A, analysis module 186 outputs a request to user account module 182 for information about the user of user device 110. In response, analysis module 186 may receive from user account module 182 information about available payment methods and account balance information for the user. Analysis module 186 may further receive information about prior transactions by the user in which coffee was purchased, and other information about the user and/or the user's preferences or purchase history. Analysis module 186 also outputs a request to data store 189, requesting information about one or more commercial entities 140 that are available for purchasing coffee near the location of user device 110. In response, analysis module 186 may receive information about one or more commercial entities 140. Analysis module 186 also may receive information about policies, reward incentives, incentive structures, offers, and/or available services provided by or associated with such commercial entities 140.

Computing system 170 may analyze the collected information in preparation for generating a recommendation. For instance, still with reference to the example being described, analysis module 186 uses the collected information to perform an analysis to identify one or more candidate commercial entities 140, where such candidate commercial entities 140 are options relevant to the user's request ("where should I buy coffee today?"). In some examples, analysis module 186 chooses such candidate commercial entities based on the user's payment options, preferences, location, time of day, as well as the policies, hours of operation, reward and incentive structures offered by each of commercial entities 140 and other considerations. In performing the analysis, analysis module 186 may analyze incentives and reward policies across multiple commercial entities 140, and recommend one or more of such commercial entities 140 based on opportunities to maximize rewards, cost savings, time savings, and/or conveniences based on available offers and policies in place at such commercial entities 140. Accordingly, analysis module 186 may seek, through its analysis, to optimize cost savings, time savings, conveniences, coffee quality, and/or other benefits or advantages. Analysis module 186 may identify a single commercial entity 140, or in some examples, may identify a number of commercial entities 140 that are appropriate responses to the user's request. Analysis module 186 may identify how the coffee should preferably be purchased (e.g., purchasing through an app, using the drive-through window, or making an in-restaurant purchase), again in an effort to maximize rewards, cost savings, time savings, and/or conveniences. Analysis module 186 may also identify an appropriate payment method (e.g., gift card or specific credit card).

Computing system 170 may provide a recommendation. For instance, again with reference to the example being described, analysis module 186 causes communication unit 175 to output a signal over network 105. Communication unit 115 of user device 110 detects a signal and outputs an indication of the signal to advisor module 126. Advisor module 126 determines that the signal is a response to the user's request to identify information about an appropriate place for the user of user device 110 to purchase coffee ("where should I buy coffee today?"). Advisor module 126 causes user interface module 121 of user device 110 to output audio, which includes an audible notification 421A, recommending that the user of user device 110 purchase coffee at "ABC Bagels," using the user's XYZ Bank credit card (see FIG. 4A). Alternatively, or in addition, user interface module 121 of user device 110A may output user interface 401A on a display associated with user device 110, as illustrated in FIG. 4A. Where the recommendation provided by computing system 170 suggests using a particular method of payment, advisor module 126 may modify or adjust any primary or default credit card used by user device 110 for making purchases so that if the user of user device 110 simply uses the default payment method, the recommended payment method will be automatically be used.

For some user queries, computing system 170 may be able to provide a specific, single recommendation in response to the user's query. For other queries, however, computing system 170 may provide multiple options along with information that enables to the user to make an informed choice about which option to select.

Figure 4B:
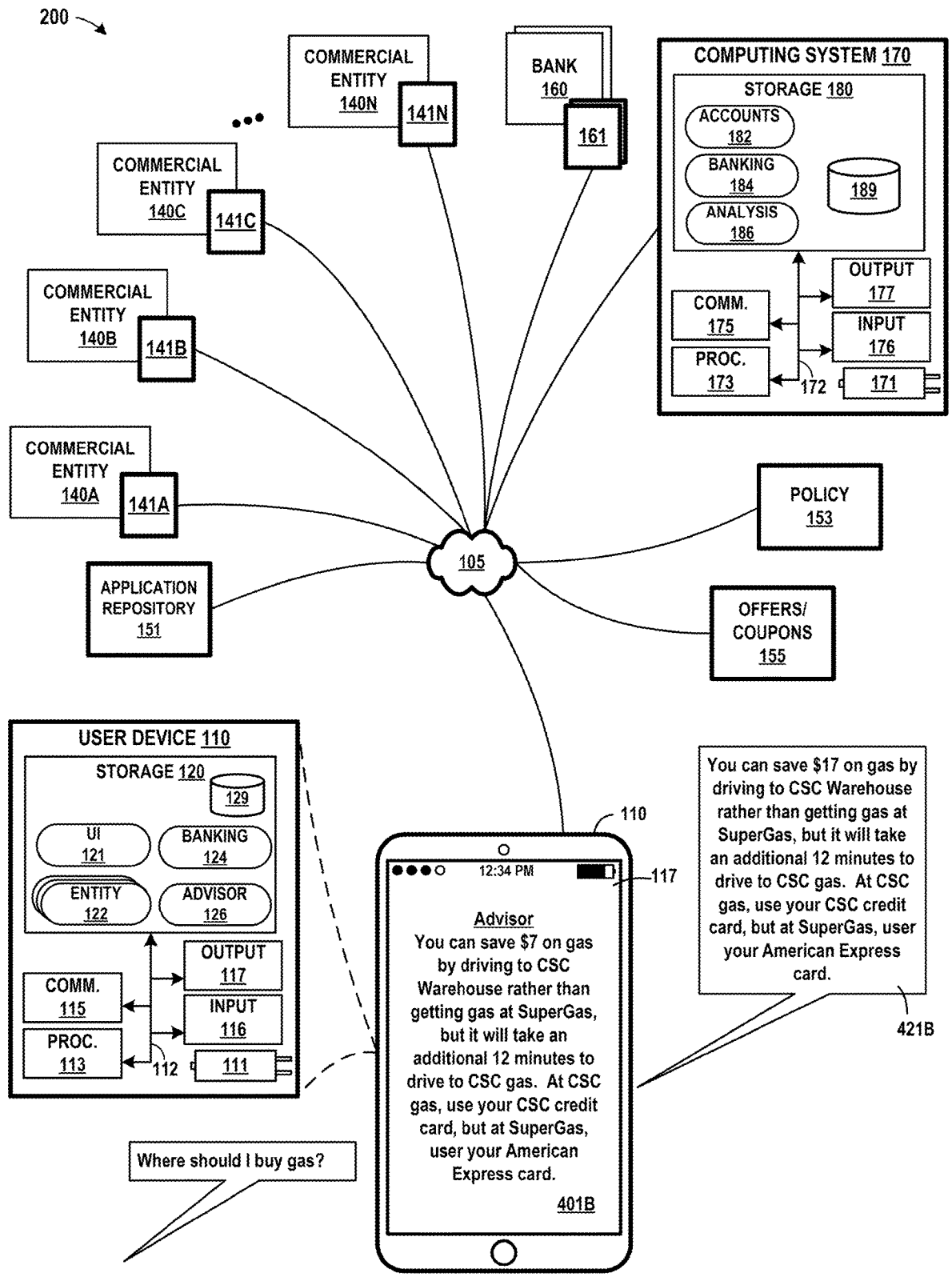

For example, in FIG. 4B, and in an example that can be described with reference to FIG. 4B, a user might ask "where should I buy gas?" In response to detecting input corresponding to such a question, user device 110 outputs information about the question over network 105 to computing system 170. Analysis module 186 of computing system 170 analyzes the information about the question, along with information about the user, the user's situation, context, and location, and information about the user's relationships with one or more commercial entities 140 (some of which may include gas stations). The analysis performed by analysis module 186 may be similar to that described in connection with FIG. 4A. Based on such an analysis, computing system 170 determines a recommendation and outputs information about the recommendation over network 105. User device 110 receives the information about the recommendation. In response, advisor module 126 causes user interface module 121 to output notification 421B (and/or user interface 401B) describing the recommendation. In the example illustrated in FIG. 4B, the recommendation provides the user a choice about where to get gas, and enables the user to choose whether saving $17 on gas is worth the extra 12 minutes that it will take to save the $17.

In some examples, computing system 170 may be able to determine, based on an estimate about how much the user values his or her time, whether a cost/benefit analysis provides a clear answer to whether it makes sense for the user to invest a specified amount of time to save a specified amount of money. But in cases where that cost/benefit analysis does not point to an obvious course of action, the recommendation provided by computing system 170 in FIG. 4B may appropriately leave the choice to the user of user device 110.

Figure 4C:
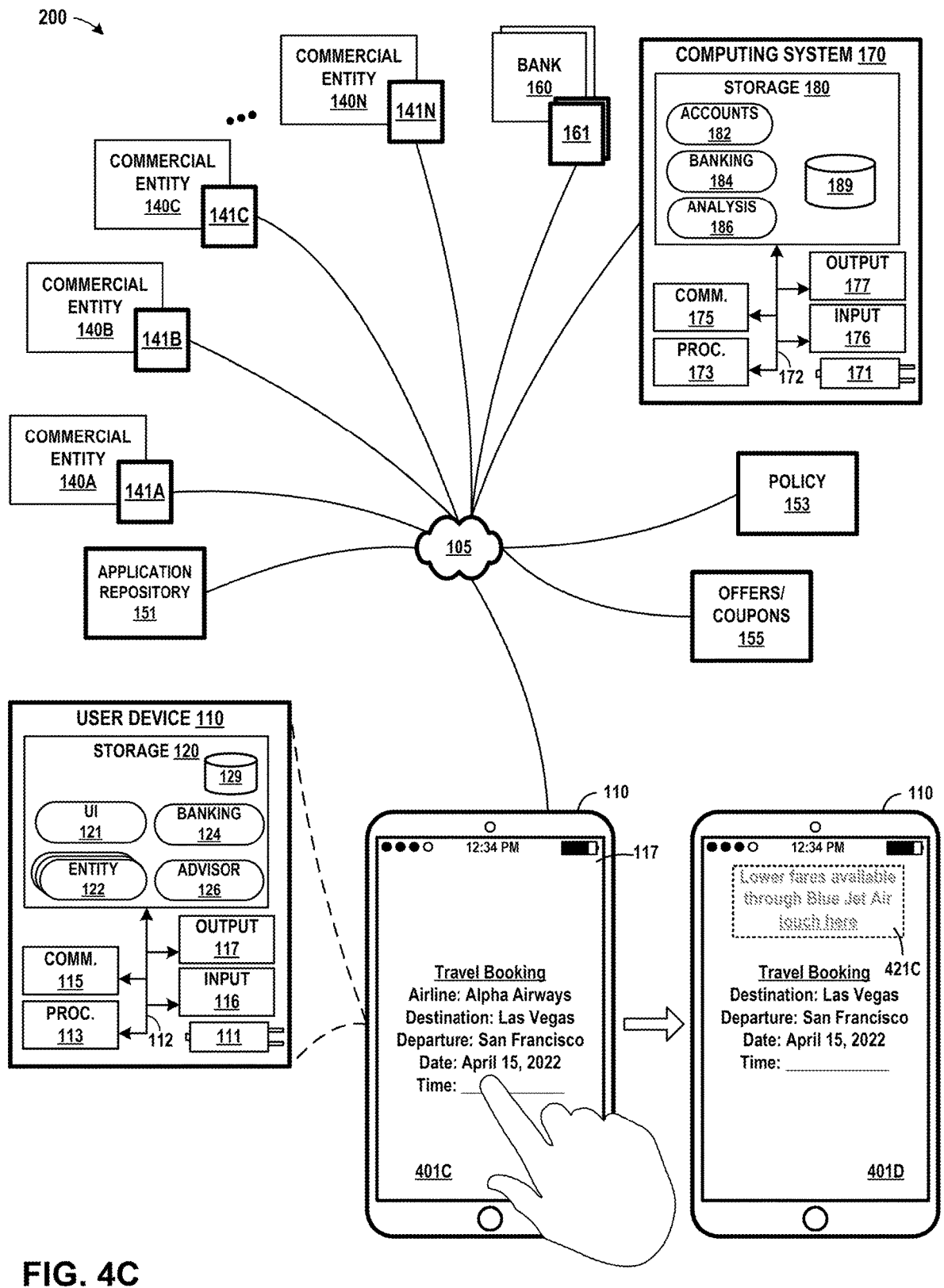

In FIG. 4C, computing system 170 may generate a recommendation based on use of a specific application executing on user device 110. For instance, in an example that can be described with reference to FIG. 4C, input device 116 of user device 110 detects input that user interface module 121 determines corresponds to interactions with a user interface associated a specific entity module 122. User interface module 121 further determines that the specific entity module 122 is associated with one of commercial entities 140. Advisor module 126 causes communication unit 115 to output a signal over network 105. Communication unit 175 of computing system 170 detects a signal over network 105 that analysis module 186 determines includes information about an in-progress booking of air travel from San Francisco to Las Vegas on Apr. 15, 2022. Analysis module 186 performs an analysis based on the information included within the signal, along with other information, including various payment options available to the user, user preferences, and information about reward and incentive structures offered by other commercial entities 140 that may offer air travel or other travel services. Analysis module 186 generates a recommendation and causes computing system 170 to output information about the recommendation over network 105.

User device 110 may communicate the recommendation to the user. For instance, still with reference to the example being described with reference to FIG. 4C, advisor module 126 of user device 110 receives information about the recommendation from computing system 170 and determines that the information is relevant to the user's in-progress booking of air travel. While the user is interacting with user interface 401C in FIG. 4C, advisor module 126 causes user interface module 121 to output notification 421C on the display screen, as shown in user interface 401D of FIG. 4C. In response to detecting interaction with notification 421A, advisor module 126 may cause user interface module 121 to present additional information, such as information about air fares available at a competing airline (i.e., Blue Jet Air), along with suggestions as to how to pay for the air fare, when to book, how to secure additional rewards points, and/or additional information.

Figure 4D:
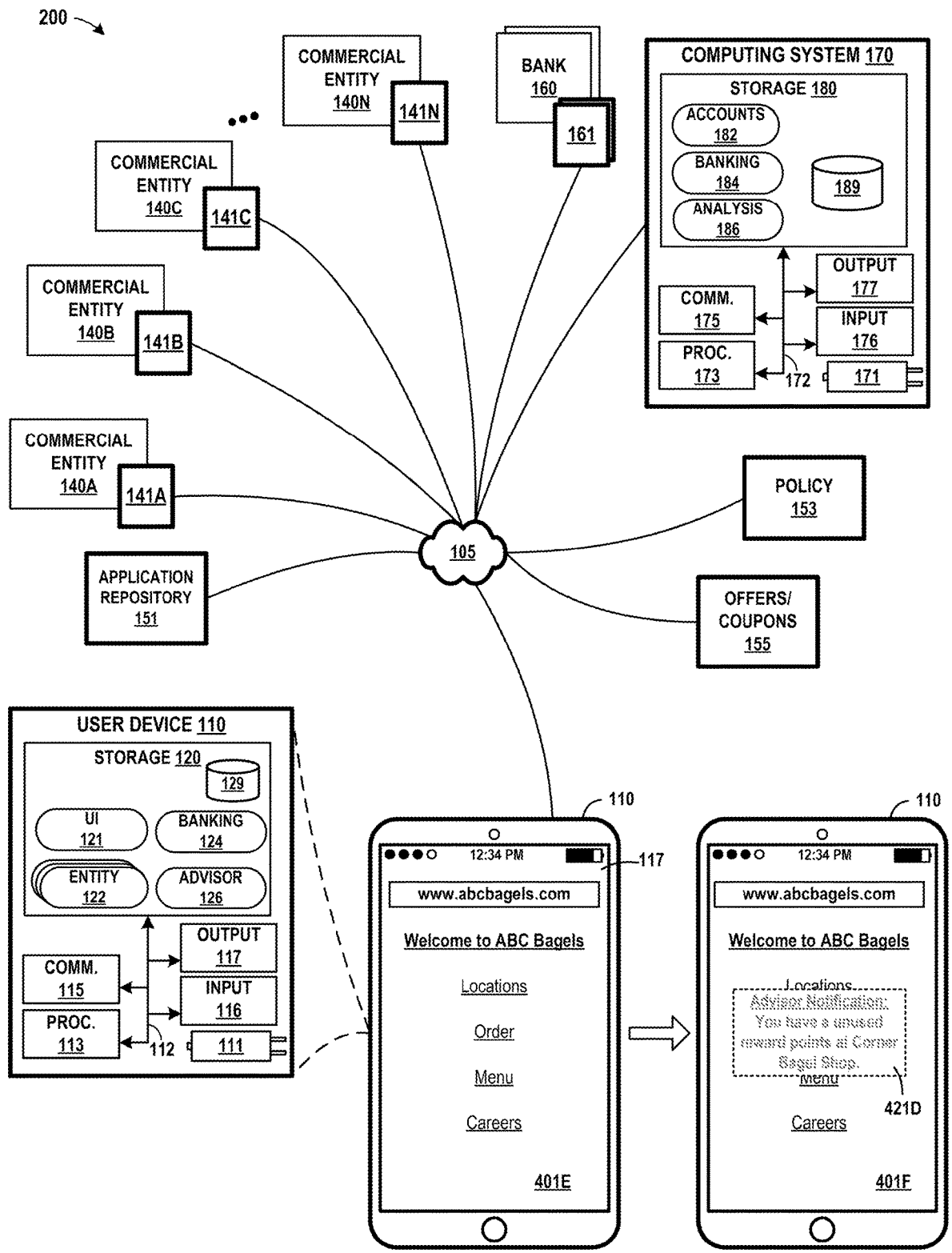

In FIG. 4D, computing system 170 may generate a recommendation based on browsing activity at user device 110. For instance, in an example that can be described in connection with FIG. 4D, advisor module 126 of user device 110 detects web browsing activity at user device 110, and determines that the browsing activity involves browsing activity relating to bagel shops, as illustrated in user interface 401E of FIG. 4D. Based on this browsing activity, advisor module 126 causes user device 110 to output a signal over network 105. Analysis module 186 of computing system 170 detects a signal and determines that the signal includes information about browsing activity taking place at user device 110. Analysis module 186 further determines that the browsing activity relates to bagel shops and/or restaurant web sites. Analysis module 186 performs an analysis based on the browsing activity and uses that information, along with other information stored at computing system 170 or available to computing system 170, to generate a recommendation. Analysis module 186 causes computing system 170 to output information over network 105 that advisor module 126 of user device 110 determines corresponds to a recommendation.

User device 110 may communicate the recommendation to the user while browsing activity is taking place. For instance, again with reference to FIG. 4D, advisor module 126 causes user interface module 121 to present notification 421D to the user while the user is browsing www.abcbagels.com, as illustrated in user interface 401F. As illustrated in FIG. 4D, notification 421D reminds the user that unused reward points are available at "Corner Bagel Shop," which may be a competitive bagel shop and one of commercial entities 140.

Figure 4E:
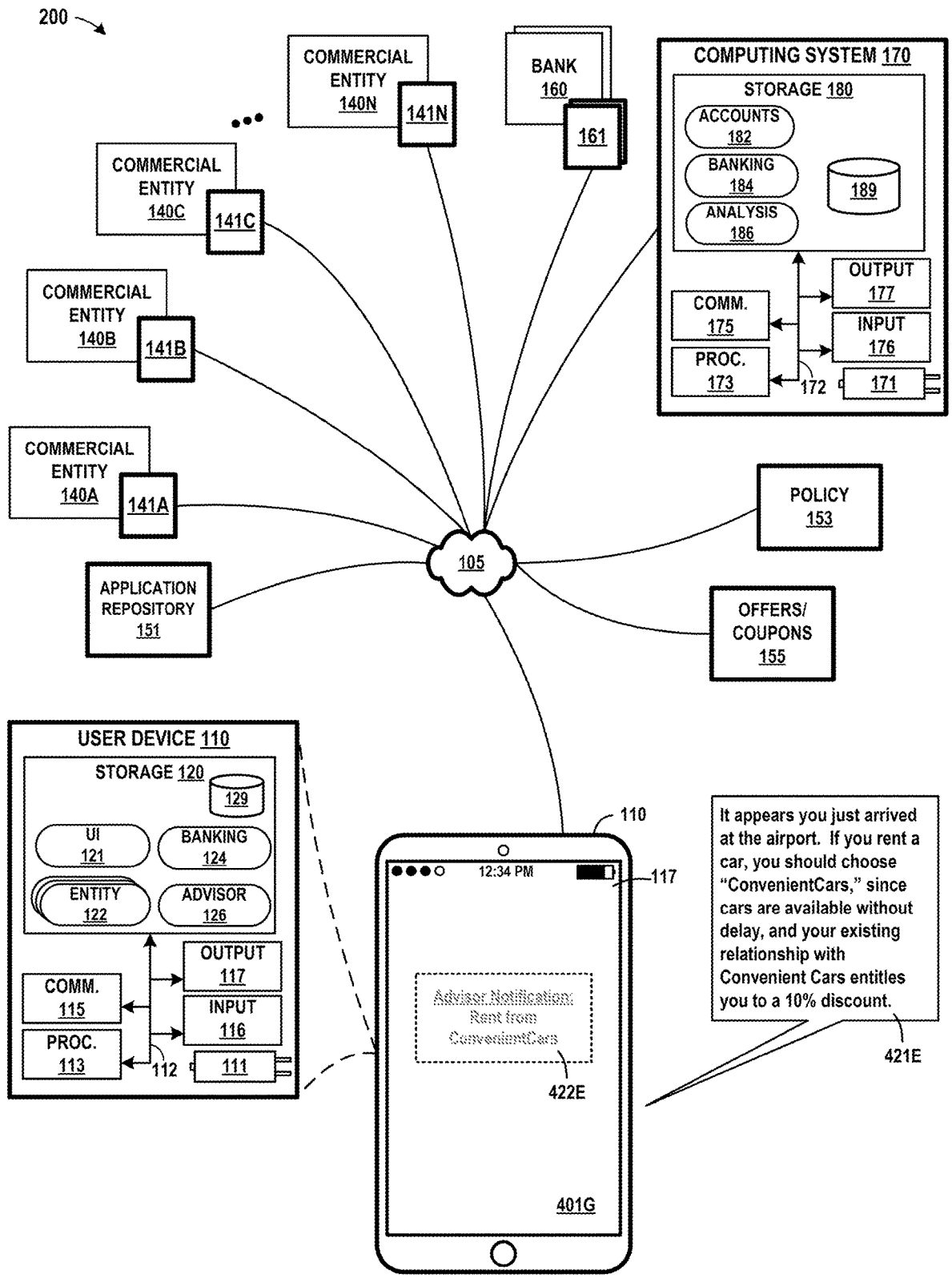

In FIG. 4E, user device 110 may provide a recommendation based on a user's current activity and/or location. For instance, in an example that can be described in connection with FIG. 4E, advisor module 126 outputs a signal over network 105 that includes information about the location of user device 110. Communication unit 175 of computing system 170 detects a signal over network 105 and determines that the signal includes information about the location of user device 110. Analysis module 186 determines, based on the location and additional information about prior locations of user device 110, that user device 110 has just arrived at a specific airport after departing an airplane. Based on this information, analysis module 186 performs an analysis and determines a recommendation. Analysis module 186 causes computing system 170 to output information over network 105 that advisor module 126 of user device 110 determines corresponds to a recommendation. Advisor module 126 causes user interface module 121 to present audio in the form of notification 421E. Alternatively, or in addition, advisor module 126 causes user interface module 121 to present notification 422E on a display associated with user device 110. As illustrated in FIG. 4E, both notification 421E and notification 422E suggest to the user that if a rental car is needed, a specific car rental company (i.e., a specific commercial entity 140) should be chosen for the reasons stated in notification 421E.

In some examples, computing system 170 may generate a recommendation that is based on an indication of input detected at user device 110 (e.g., audio of the user asking a question, or other types of input that is interpreted as a request made by the user for information or advice). In some examples, however, including in the examples described above in connection with FIG. FIG. 4C,4D, and FIG. 4E, computing system 170 may receive a request that is generated automatically by user device 110, and not based on an indication of user input that includes the request (i.e., in the example described in FIG. 4E, the user did not specifically ask for information about car rentals upon arriving at the airport). Accordingly, a request, as described herein, may be generated based on an explicit query or request composed by the user in which the user is seeking advice. In other examples, such a request may be generated automatically, based on a location of user device 110, the context of the situation, the user's interaction with user device 110, or based on interactions with other devices by user device 110.

Figure 4F:
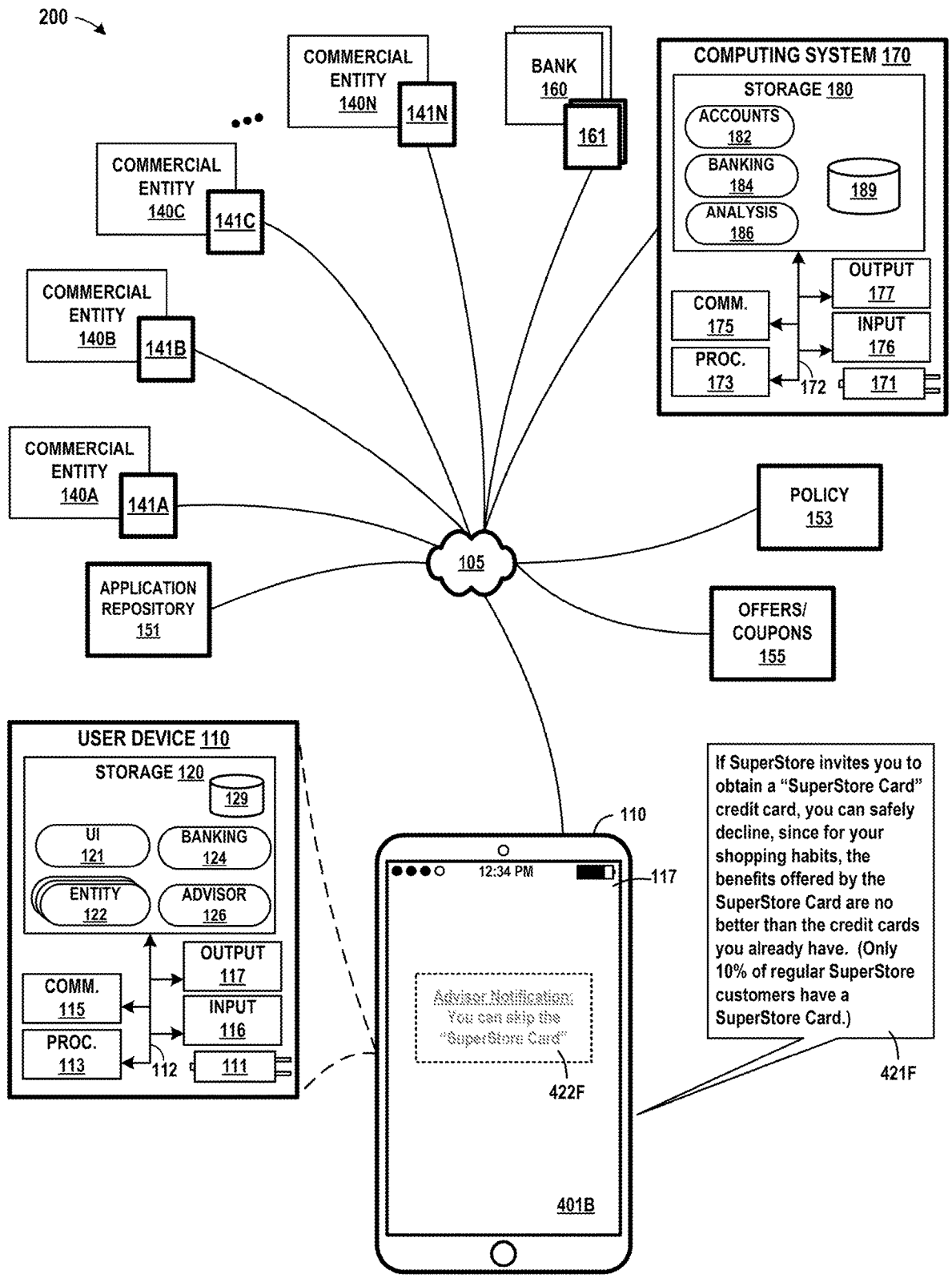

Computing system 170 may provide advice about offers that may be presented to the user of user device 110. For instance, in an example that can be described in connection with FIG. 4F, advisor module 126 outputs a signal over network 105 that includes information about the location of user device 110. Communication unit 175 of computing system 170 detects a signal over network 105 and determines that the signal includes information about the location of user device 110. Analysis module 186 determines, based on the location and a recent transaction associated with one of commercial entities 140, that that the user of user device 110 is shopping at a "SuperStore" retail location. Analysis module 186 determines, based on this information and additional information indicating that the retailer "SuperStore" tends to offer its customers a "SuperStore Card," and that providing information to the user about such an offer would be appropriate. Analysis module 186 causes computing system 170 to output information over network 105 that advisor module 126 of user device 110 determines corresponds to a recommendation. Advisor module 126 causes user interface module 121 to present audio in the form of notification 421F. Alternatively, or in addition, advisor module 126 causes user interface module 121 to present notification 422F on a display associated with user device 110. As illustrated in FIG. 4F, both notification 421F and notification 422F suggest to the user accepting any offer of a "SuperStore Card" should be declined. In some examples, such a recommendation may provide reasons for declining the offer (e.g., few "SuperStore" retailers near the user's home), or alternatively, reasons for accepting the offer (e.g., accepting the offer would save the user approximately $100 per year).

In some examples, analysis module 186 may determine whether a "SuperStore Card" is appropriate for the user of user device 110 based on crowd-sourced information. Such information may include information about how satisfied other users are with such a card, and/or how much such users use the card and gain rewards. Such information may also include information about how many users have such a card, which itself may provide useful information about how advantageous such a card may be.

Figure 4G:
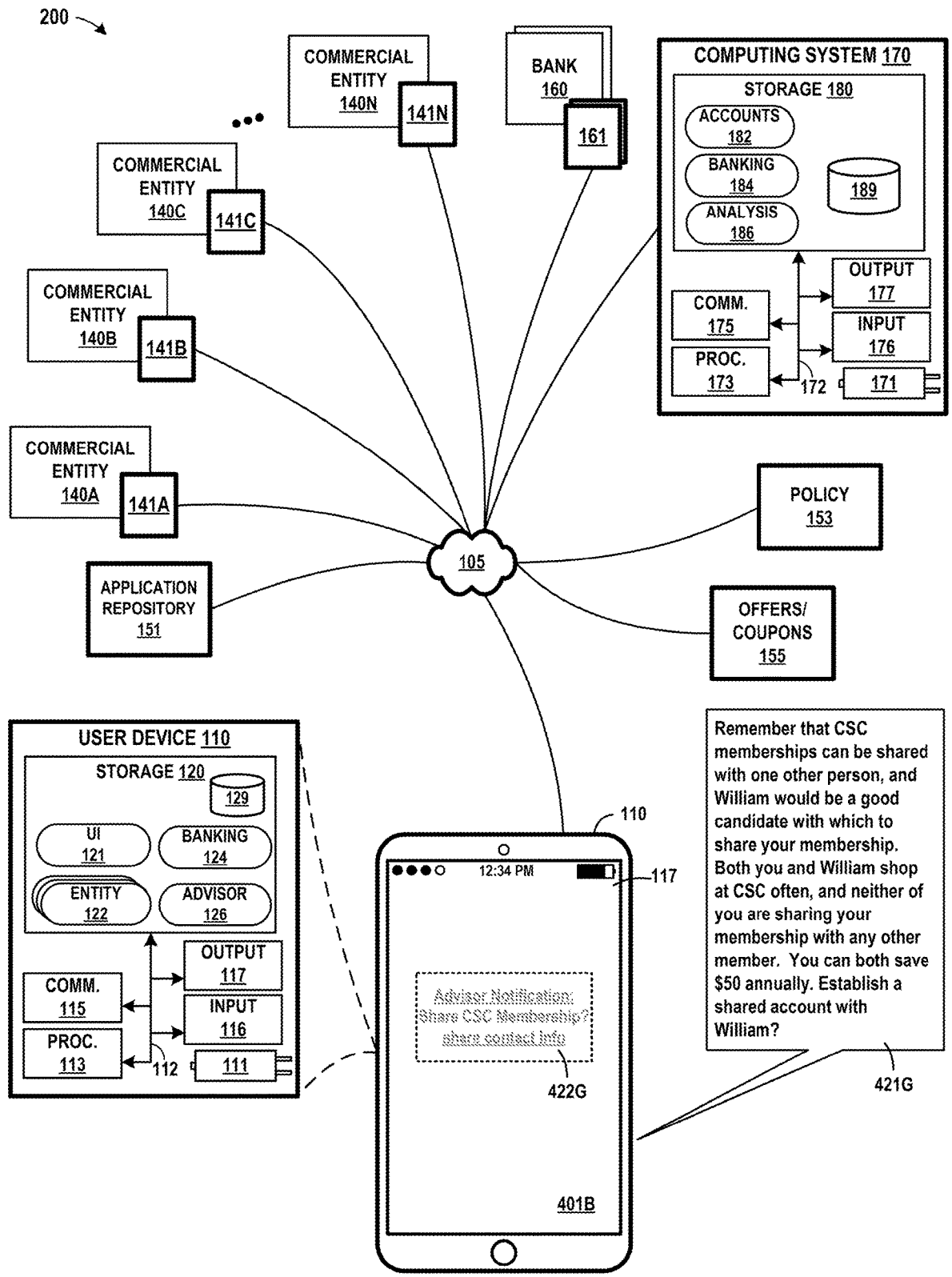

Computing system 170 may identify opportunities to obtain benefits by sharing a subscription or other service. For instance, in an example that can be described in connection with FIG. 4G, advisor module 126 outputs a signal over network 105 that includes information about the location of user device 110. Communication unit 175 of computing system 170 detects a signal over network 105 and determines that the signal includes information about the location of user device 110. Analysis module 186 determines, based on the location of user device 110 and also based on the location of another user's device (which may also have a version of advisor module 126 installed), that user device 110 and the other device are near each other, and that the users appear to know each other well (e.g., determined based on frequent communications between the two devices or email addresses associated with the users). Analysis module 186 further determines, based on this information and information about the other device (e.g., which may be received directly from the other device) that users of both devices are members of a warehouse shopping club ("CSC"), which is one of commercial entities 140. Still further, analysis module 186 determines that both users are eligible for a shared membership to the CSC Warehouse Shopping Club, yet neither user is taking advantage of such a shared membership. Based on this information, analysis module 186 causes computing system 170 to output information over network 105 that advisor module 126 of user device 110 determines corresponds to a recommendation. Advisor module 126 causes user interface module 121 to present audio in the form of notification 421G. Alternatively, or in addition, advisor module 126 causes user interface module 121 to present notification 422G on a display associated with user device 110. As illustrated in FIG. 4G, each of notification 421F and notification 422F suggest to the user that the user's membership be shared with the other user ("William").

In some examples, notification 422G may provide an option to enable the user of user device 110 to share contact information with the other user. If such contact information is accepted, user device 110 may communicate with computing system 170 and/or the appropriate entity computing system 141 associated with CSC Warehouse Shopping Club to automatically establish a CSC shared membership.

Various examples have been described in the context of FIG. 4A through FIG. 4G in which a recommendation, notification, or other information is presented to the user (e.g., through user device 110) at appropriate or opportune times. Other examples are possible. For example, computing system 170 may automatically, based on knowledge of a user's relationship with a specific commercial entity 140, seek to negotiate better terms for the user's relationship with that commercial entity 140, which could involve securing a new service plan that better suits the user's usage patterns. In some examples, computing system 170 may use information gained through access to information about other users' relationships with that same commercial entity 140 (e.g., crowd-sourced information, which could include information about the average amount paid or benefits to other customers), and use that information to determine whether a user might be offered or entitled to more favorable terms from commercial entity 140.

In another example, computing system 170 might detect changes in prices associated with goods and/or services provided by a given commercial entity 140, and notify the user about such price changes. In some cases, a user may be entitled to a status discount (e.g., a "student" discount), and computing system 170 may determine that a user has been improperly characterized as no longer having access to such a status. In such an example, computing system 170 may provide an appropriate notification to a user of user device 110 (or to the relevant commercial entity 140), and such a notification could be used to correct the improper characterization.

In another example, computing system 170 may provide advice relating to specific financial terms for credit cards or other payment methods used by a user. For instance, some credit cards may offer interest rates that change at different times, or in different contexts, and computing system 170 may provide recommendations designed to assist the user in optimizing which credit card should be used for specific transactions. In addition, computing system 170 might also provide notifications that take into account other factors, such as those relating to cycle timing or billing cycle timing, or other factors that may be applicable to credit cards or other methods of payment.

Figure 5A:
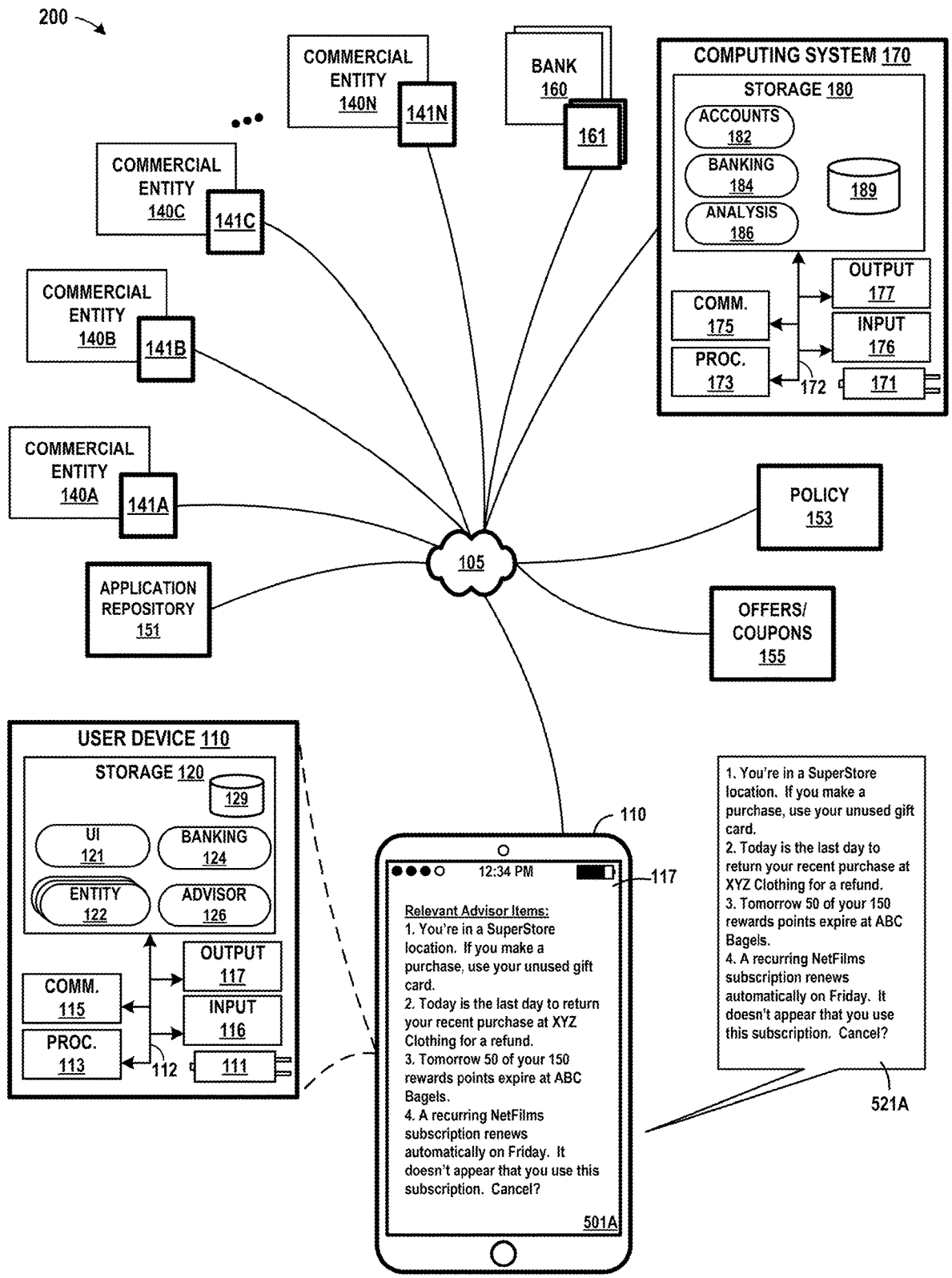
FIG. 5A and FIG. 5B are conceptual diagrams illustrating how information about various offers, rewards, and/or advice may be presented using a user device, in accordance with one or more aspects of the present disclosure.
Figure 5B:
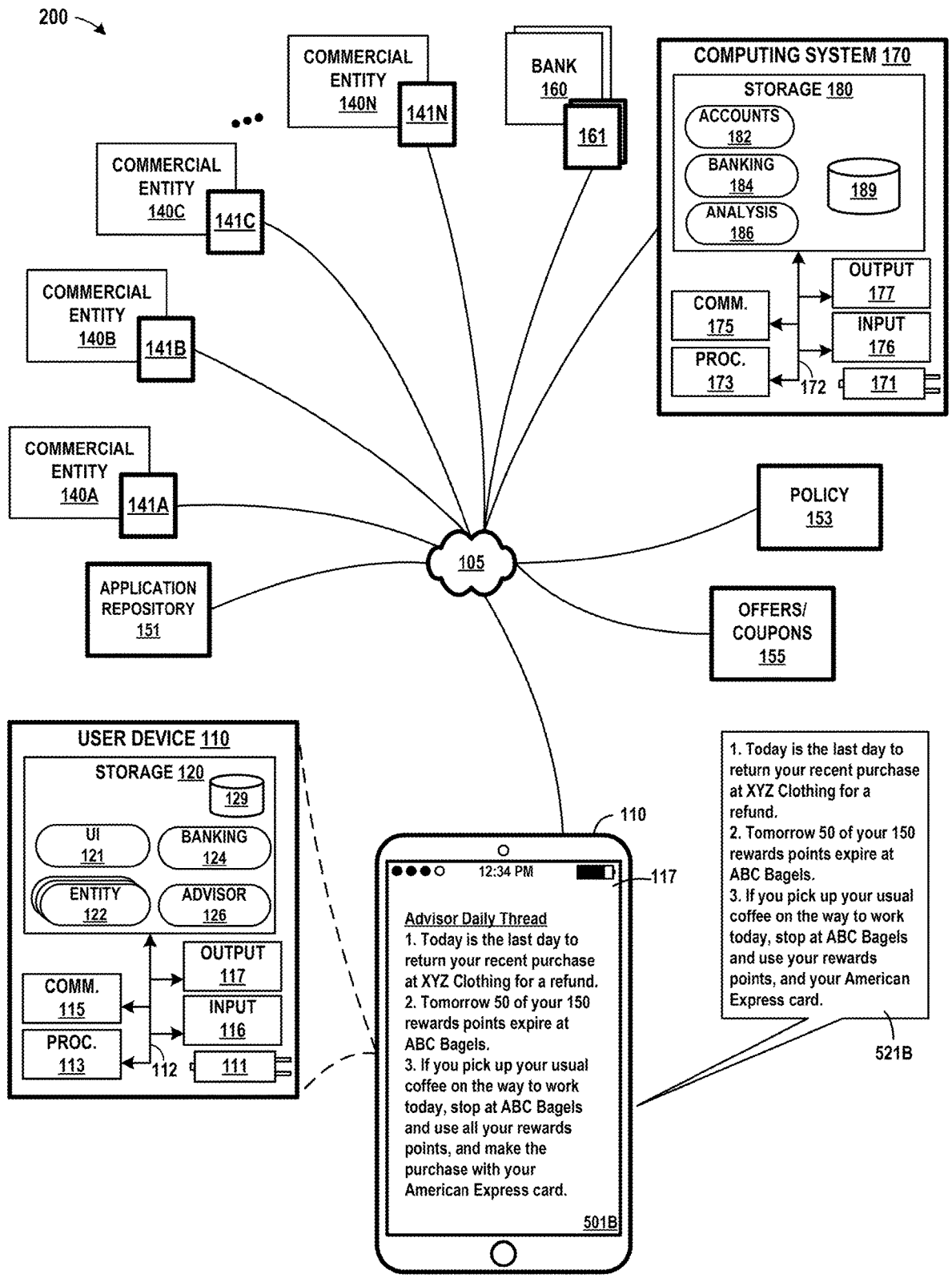

FIG. 5A and FIG. 5B are conceptual diagrams illustrating how information about various offers, rewards, and/or advice may be presented using a user device 110, in accordance with one or more aspects of the present disclosure. As with FIG. 3A through FIG. 3E and FIG. 4A through FIG. 4G, user device 110 of FIG. 5A and FIG. 5B may correspond to user device 110 of FIG. 2 and/or one or more of user devices 110 of FIG. 1. Similarly, although FIG. 5A and FIG. 5B are illustrated in the context of user device 110 as represented by a mobile device or mobile phone, techniques involving other types of user devices 110 may be employed without departing from the spirit and scope of this disclosure.

FIG. 5A illustrates how a list of action items, reminders, and other information may be presented in response to a user request. For instance, in an example that can be described in the context of FIG. 5A, input device 116 of user device 110 detects input and outputs an indication of input to user interface module 121. User interface module 121 outputs information about the input to advisor module 126. Advisor module 126 determines that the input corresponds to a request to present information about items relevant to the user's relationship with one or more of commercial entities 140. In some examples, the input detected by user device 110 may result from interactions with an on-screen user interface presented by advisor module 126. In other examples, the input detected by user device 110 may be a spoken command that user interface module 121 detects and recognizes as human speech.

Computing system 170 may generate and output a user interface listing information responsive to the user's request. For instance, again referring to the example being described in the context of FIG. 5A, advisor module 126 causes communication unit 115 to output a signal over network 105. Communication unit 175 of computing system 170 detects a signal and outputs an indication of the signal to analysis module 186. Analysis module 186 determines that the signal corresponds to a request to generate information for user device 110. In some examples, the request may the location of user device 110 (e.g., the current location of user device 110). In other examples, the request may include information about a specified location (e.g., the user's expected destination while driving). Analysis module 186 interacts with user account module 182 to collect information about the user of user device 110, and analysis module 186 also interacts with data store 189 to collect information about the relationship between the user of user device 110 and each of commercial entities 140. Analysis module 186 uses the collected information, along information about the location of user device 110 (or the specified location), to generate information responsive to the user's request. Analysis module 186 generates information that can be used as the basis for a user interface to present at user device 110. Analysis module 186 causes communication unit 175 to output a signal over network 105.

User device 110 may present a user interface with information responsive to the user's request. For instance, again referring to the example being described in the context of FIG. 5A, user device 110 detects a signal over network 105 that advisor module 126 determines corresponds to information that can be used as the basis for a user interface. Advisor module 126 causes user interface module 121 to present a "Relevant Advisor Items" user interface 501A using output device 117 of user device 110. In such an example, output device 117 may be a display presenting the user interface content. Alternatively, or in addition, output device 117 may be or include an audio device that presents the same or similar content as audio notification 521A.

FIG. 5B illustrates how information about action items, reminders, and other information might be presented periodically using a user device 110, in accordance with one or more aspects of the present disclosure. For instance, in an example that can be described in the context of FIG. 5B, input device 116 of user device 110 detects input and outputs an indication of input to user interface module 121. User interface module 121 outputs information that advisor module 126 determines corresponds to a request to present information about items relevant to the user's relationship with one or more of commercial entities 140 for a particular time period, such as the current day, the current week, or the current month. Accordingly, the request may specify a timeframe (e.g., the current time) or a specified timeframe (e.g., the upcoming week). In some examples, the input detected by user device 110 may involve interactions with an on-screen user interface presented by advisor module 126, and in other examples, the input may be an audio command that user interface module 121 detects and recognizes as human speech.

Computing system 170 may generate and output a user interface providing a "daily thread" of information. For instance, again referring to the example being described in the context of FIG. 5B, advisor module 126 causes communication unit 115 to output a signal over network 105. Communication unit 175 of computing system 170 detects a signal that analysis module 186 determines corresponds to a request to generate information for "daily thread" content for the user of user device 110. Analysis module 186 interacts with user account module 182 to access information about the user of user device 110. Alternatively, or in addition, analysis module 186 also interacts with data store 189 to determine information about the relationship between the user of user device 110 and each of commercial entities 140. Such information may relate to ongoing subscription fees, how often such subscriptions are used, reward points, credit card offers, credit card interest rates, outstanding purchases, purchases that are still within a return and/or refund window, information about upcoming travel arrangements or potential travel arrangements, and other information. Analysis module 186 generates information that can be used as the basis for a user interface to present at user device 110. Analysis module 186 causes communication unit 175 to output a signal over network 105.

User device 110 may output the "daily thread" of information. For instance, again referring to the example being described in the context of FIG. 5B, user device 110 detects a signal that advisor module 126 determines corresponds to information that can be used as the basis for a user interface. Advisor module 126 causes user interface module 121 to present an "Advisor Daily Thread" user interface 501B using output device 117 of user device 110. In some examples, output device 117 may be a display presenting the "Daily Thread" content. Alternatively, or in addition, output device 117 may be an audio device that presents the same or similar content as audio notification 521B.

In some examples, user interface 501B may present an ordered list of items, with the most urgent, high value, and/or significant items at the top of the list. The most "urgent" items may correspond to those having a near-term deadline or that may require numerous items to be completed prior to the deadline. The most "significant" items may correspond to those that would lead to greater cost savings, time savings, and/or conveniences or other substantial benefits. Alternatively, or in addition, the most significant items may correspond to recent items or items having recent activity. More urgent, high value, and/or significant items might also be presented prominently or larger or with a specific font or color within user interface 501B, thereby increasing the chance that the user of user device 110 will notice such items.

Although user interface 501B and notification 521B have been described as being presented in response to a user request, each of user interface 501B and/or notification 521B may be presented automatically, and not in response to an explicit request. For instance, user interface 501B (and/or notification 521B) may be presented at a specific time of day (e.g., in the morning). Alternatively, or in addition, user interface 501B (and/or notification 521B) may be presented in response to a specific event. Such an event may include detecting that the user was just awakened and/or is interacting with user device 110 for the first time that day. In another example, such an event may involve determining that user device 110 is in motion, and leaving the user's home in the morning for the first time.

Figure 6:
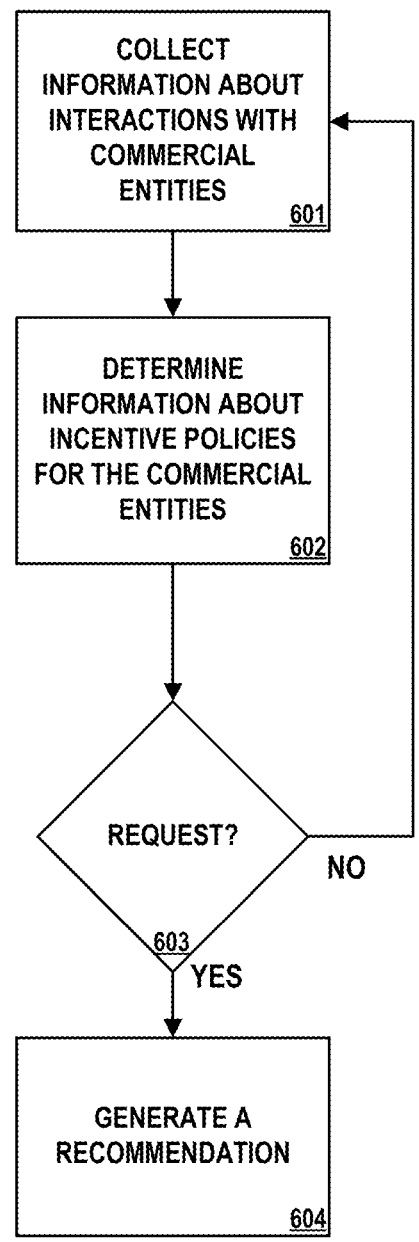
FIG. 6 is a flow diagram illustrating operations performed by an example computing system in accordance with one or more aspects of the present disclosure.

FIG. 6 is a flow diagram illustrating operations performed by an example computing system 170 in accordance with one or more aspects of the present disclosure. FIG. 6 is described below within the context of computing system 170 of FIG. 1. In other examples, operations described in connection with FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, computing system 170 may collect information about interactions with commercial entities (601). For example, with reference to FIG. 1, user device 110 detects input and outputs a signal over network 105. Computing system 170 detects a signal over network 105. Computing system 170 determines that the signal includes information about interactions between user device 110 and one or more of commercial entities 140. In some examples, such interactions may represent shopping activity or purchases of goods and/or services at one or more commercial entities 140. In some cases, such purchases may be performed using user device 110. In other examples, such interactions may represent other information, such as browsing activity relating to one or more commercial entities 140, audio detected by user device 110, or physical visits to a specific location by the user, such as a restaurant, retail store, or bank branch. Computing system 170 stores information about the interactions for later use.

Computing system 170 may determine information about incentive policies for the commercial entities (602). For example, again referring to FIG. 1, computing system 170 outputs a series of signals over network 105. Policy repository 153 detects at least some of the signals and determines that that the signals correspond to a request for information about incentive structures associated with rewards offered by one or more of commercial entities 140. In response, policy repository 153 outputs over network 105 information responsive to the request. Computing system 170 receives the information over network 105 and stores the information for later use.

Computing system 170 may detect a request (603). For example, in FIG. 1, user device 110 detects input consistent with shopping activity at one or more of commercial entities 140. In some examples, such shopping activity may involve a visit to a physical store associated with a specific commercial entity 140. In other examples, such shopping activity may involve communications over network 105 between user device 110 and one of entity computing systems 141 associated with a specific commercial entity 140. In response to detecting such shopping activity, user device 110 outputs a signal over network 105. In some examples, user device 110 outputs the signal over network 105 automatically, without waiting for a specific request to do so. In other examples, user device 110 may output a signal over 105 in response to a user request (e.g., "where should I buy coffee?"). Computing system 170 detects a signal over network 105 and determines that the signal corresponds to a request. Computing system 170 may further determine that the signal includes information about shopping activity taking place using user device 110.

Computing system 170 may generate a recommendation (604). For example, again with reference to FIG. 1, computing system 170 uses the stored shopping activity (collected at 601), the information about incentive policies (collected at 602), and information about a request (received at 603) to generate a recommendation. In making the recommendation, computing system 170 may seek to optimize cost savings, time savings, conveniences, coffee quality, and/or other benefits or advantages. In some examples, computing system 170 generates the recommendation in the form of a notification or alert. Such a notification or alert may be generated by computing system 170 in an attempt to enable a user of user device 110 to save money, save time, maximize rewards benefits, realize conveniences, and obtain other benefits.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., user devices 110, entity computing systems 141, computing systems 170, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    detecting, by a user interface module of a user device, an indication of a first dragging motion across a display screen to a display element representing a first application associated with a first commercial entity executing on the user device and a second dragging motion across the display screen to a display element representing a second application associated with a second commercial entity executing on the user device;
    configuring the user device, by an advisor application executing on the user device and based on the detection of the indication of the first and second dragging motions by the user interface module, to enable the advisor application to collect information about interactions that the first application has with the first commercial entity and that the second application has with the second commercial entity;
    collecting, by the advisor application executing on the user device and after configuring the user device, information about interactions that the first application has with the first commercial entity and the second application has with the second commercial entity, wherein the first commercial entity and the second commercial entity are competing commercial entities;

outputting, by the user device and over a network, the information about the interactions;

receiving, by a computing system, the information about the interactions;

determining, by the computing system, information about incentive policies for each of the first commercial entity and the second commercial entity;

automatically generating, by the user device, a request for a recommendation about a specified type of transaction;

receiving over the network, by the computing system and from the user device, the request;

generating, by the computing system, a recommendation responsive to the request, wherein the recommendation is generated based on the information about the interactions and an analysis of the incentive policies for each of the first commercial entity and the second commercial entity; and outputting over the network, by the computing system and to the user device, information to cause automatic presentation of the recommendation at the user device.

2. The method of claim 1, wherein collecting the information about the interactions includes:

collecting information about transactions performed by a user, using the user device, with each of the first commercial entity and the second commercial entity.

3. The method of claim 1, wherein receiving the request includes:

receiving information derived from audio of a spoken question, detected by the user device, asking which commercial entity should be chosen to perform the specified type of transaction.

4. The method of claim 1, wherein receiving the request includes receiving a request to present information relevant to at least one of:

a current time, a specified timeframe, a current location of the user device, or a specified location of the user device.

5. The method of claim 1, wherein receiving the request includes receiving at least one of:

information that includes a location of the user device, information about shopping activity taking place at the user device, or information about browsing activity taking place at the user device.

6. The method of claim 1, wherein determining information about incentive policies includes:

accessing information published at a plurality of entity computing systems, each controlled by a respective commercial entity.

7. The method of claim 1, wherein generating the recommendation includes generating the recommendation based on at least one of:

a quantity of rewards points accumulated by a user at least one of the first commercial entity or the second commercial entity, reward incentive structures associated with each of the first commercial entity and the second commercial entity, payment options available to the user, interest rates associated with one or more of the payment options, or crowd-sourced ratings information.

8. The method of claim 1, wherein outputting information to cause automatic presentation of the recommendation includes enabling the user device to present at least one of:

a visual notification, an audio notification, a haptic notification, a visual user interface presenting the recommendation, audio describing the recommendation, a cross-device notification, an artificial reality user interface, or a heads-up display in an automobile.

9. A computing system comprising processing circuitry and a storage device, wherein the processing circuitry has access to the storage device and is configured to:

enable a user interface module of a user device to detect a first dragging motion across a display screen to a display element representing a first application associated with a first commercial entity executing on the user device and a second dragging motion across the display screen to a display element representing a second application associated with a second commercial entity executing on the user device;

enable the user device to configure, based on the detection of the dragging motions by the user interface module, the user device to collect information about interactions that the first application has with the first commercial entity and that the second application has with the second commercial entity;

enable the user device to collect, after configuring the user device, information about interactions that the first application has with the first commercial entity and the second application has with the second commercial entity, wherein the first commercial entity and the second commercial entity are competing commercial entities;

receive, over a network from the user device, the information about the interactions;

determine information about incentive policies for each of the first commercial entity and the second commercial entity;

receive over the network, from the user device, a request for a recommendation about a specified type of transaction, wherein the request is generated automatically by the user device;

generate a recommendation responsive to the request, wherein the recommendation is generated based on the information about the interactions and an analysis of the incentive policies for each of the first commercial entity and the second commercial entity; and output over the network, to the user device, information to cause automatic presentation of the recommendation at the user device.

10. The computing system of claim 9, wherein to enable the user device to collect the information about interactions, the processing circuitry is further configured to:

enable the user device to collect information about transactions performed by a user, using the user device, with each of the first commercial entity and the second commercial entity.

11. The computing system of claim 9, wherein to receive the request, the processing circuitry is further configured to:

receive information derived from audio of a question, detected by the user device, asking which commercial entity should be used to perform the specified type of transaction.

12. The computing system of claim 9, wherein to receive the request, the processing circuitry is further configured to receive a request to present information relevant to at least one of:

a current time, a specified timeframe, a current location of the user device, or a specified location of the user device.

13. The computing system of claim 9, wherein to receive the request, the processing circuitry is further configured to receive at least one of:

information that includes a location of the user device, information about shopping activity taking place at the user device, or information about browsing activity taking place at the user device.

14. Non-transitory computer-readable media comprising instructions that, when executed, cause processing circuitry of a computing system to:
- enable a user interface module of a user device to detect a first dragging motion across a display screen to a display element representing a first application associated with a first commercial entity executing on the user device and a second dragging motion across the display screen to a display element representing a second application associated with a second commercial entity executing on the user device;
- enable the user device to configure, based on the detection of the dragging motions by the user interface module, the user device to collect information about interactions that the first application has with the first commercial entity and that the second application has with the second commercial entity;
- enable the user device to collect, after configuring the user device, information about interactions that the first application has with the first commercial entity and the second application has with the second commercial entity, wherein the first commercial entity and the second commercial entity are competing commercial entities;
- receive, over a network from the user device, the information about the interactions;
- determine information about incentive policies for each of the first commercial entity and the second commercial entity;
- receive over the network, from the user device, a request for a recommendation about a specified type of transaction, wherein the request is generated automatically by the user device;
- generate a recommendation responsive to the request, wherein the recommendation is generated based on the information about the interactions and an analysis of the incentive policies for each of the first commercial entity and the second commercial entity s; and
- output over the network, to the user device, information to cause automatic presentation of the recommendation at the user device.

15. The method of claim 1, wherein the display element representing the first application has an appearance, and wherein the display element representing the second application has an appearance, the method further comprising:
- responsive to the first dragging motion, changing the appearance of the display element representing the first application; and
- responsive to the second dragging motion, changing the appearance of the display element representing the second application.

16. The method of claim 1, where generating the recommendation includes:
- generating a recommendation that identifies both a cost savings associated with a purchase from the first commercial entity and a time savings associated with a purchase from the second commercial entity.

17. The computing system of claim 9, wherein the display element representing the first application has an appearance, and wherein the display element representing the second application has an appearance, and wherein the processing circuitry is further configured to:
- responsive to the first dragging motion, enable the user device to change the appearance of the display element representing the first application; and
- responsive to the second dragging motion, enable the user device to change the appearance of the display element representing the second application.

18. The computing system of claim 9, wherein to generate the recommendation, processing circuitry is further configured to:
- generate a recommendation that identifies both a cost savings associated with a purchase from the first commercial entity and a time savings associated with a purchase from the second commercial entity.

19. The non-transitory computer-readable media of claim 14, wherein the display element representing the first application has an appearance, and wherein the display element representing the second application has an appearance, the media further comprising instructions that, when executed, cause the processing circuitry to:
- responsive to the first dragging motion, enable the user device to change the appearance of the display element representing the first application; and
- responsive to the second dragging motion, enable the user device to change the appearance of the display element representing the second application.

20. The non-transitory computer-readable media of claim 14, wherein the instructions that cause the processing circuitry to generate the recommendation further include instructions that, when executed, cause the processing circuitry to:
- generate a recommendation that identifies both a cost savings associated with a purchase from the first commercial entity and a time savings associated with a purchase from the second commercial entity.

* * * * *